(12) United States Patent
Sakiewicz et al.

(10) Patent No.: US 11,470,277 B2
(45) Date of Patent: *Oct. 11, 2022

(54) EMERGENCY ASSISTANCE METHOD AND DEVICE FOR A FIREARM

(71) Applicant: Solid Proof Technologies LLC, Golden, CO (US)

(72) Inventors: Paul Sakiewicz, Englewood, CO (US); William Dean Beye, II, Aurora, CO (US); Albert Tuertscher, Golden, CO (US)

(73) Assignee: Solid Proof Technologies LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,331

(22) Filed: Feb. 1, 2021

(65) Prior Publication Data

US 2021/0160452 A1 May 27, 2021

Related U.S. Application Data

(63) Continuation of application No. 16/673,671, filed on Nov. 4, 2019, now Pat. No. 10,911,712, which is a continuation-in-part of application No. 15/426,179, filed on Feb. 7, 2017, now Pat. No. 10,469,792, which
(Continued)

(51) Int. Cl.
| | |
|---|---|
| *H04N 5/77* | (2006.01) |
| *G01S 19/17* | (2010.01) |
| *F41G 1/35* | (2006.01) |
| *F41A 17/06* | (2006.01) |
| *H04N 5/232* | (2006.01) |

(Continued)

(52) U.S. Cl.
CPC .......... *H04N 5/772* (2013.01); *F41A 17/063* (2013.01); *F41G 1/35* (2013.01); *G01S 19/13* (2013.01); *G01S 19/17* (2013.01); *G11B 27/34* (2013.01); *H04N 5/232* (2013.01)

(58) Field of Classification Search
CPC .......... H04N 5/772; H04N 5/232; H04N 5/77; H04N 7/181; F41A 17/063; F41G 1/35; G01S 19/13; G01S 19/17; G01S 3/8036; G11B 27/34
See application file for complete search history.

(56) References Cited

U.S. PATENT DOCUMENTS

| | | |
|---|---|---|
| 1,955,300 A | 4/1934 | Kurnick |
| 2,144,909 A | 1/1939 | Atkin et al. |
| 2,282,680 A | 5/1942 | Sonne |

(Continued)

OTHER PUBLICATIONS

Official Action for U.S. Appl. No. 14/804,048, dated Jun. 16, 2016, 12 pages.
(Continued)

*Primary Examiner* — Girumsew Wendmagegn
(74) *Attorney, Agent, or Firm* — Sheridan Ross P.C.

(57) ABSTRACT

The present invention generally relates to an attachment for a firearm that communicates with remote device or person such as emergency services. One embodiment of the present invention is selectively interconnected to a picatinny rail, weaver rail, or other mounting means, and the embodiment includes a button that allows a user to initiate communication with emergency services without removing his or her hands from the firearm.

20 Claims, 12 Drawing Sheets

Related U.S. Application Data is a continuation of application No. 14/804,049, filed on Jul. 20, 2015, now Pat. No. 9,591,255.

(60) Provisional application No. 62/026,344, filed on Jul. 18, 2014.

(51) Int. Cl.
*G01S 19/13* (2010.01)
*G11B 27/34* (2006.01)

(56) References Cited

U.S. PATENT DOCUMENTS

| | | | |
|---|---|---|---|
| 2,990,471 | A | 6/1961 | Tiffany |
| 3,427,102 | A | 2/1969 | Wade |
| 3,530,451 | A | 9/1970 | Devine |
| 4,309,095 | A | 1/1982 | Buckley |
| 4,835,621 | A | 5/1989 | Black |
| 4,936,037 | A | 6/1990 | Holcomb et al. |
| 4,996,787 | A | 3/1991 | Holcomb et al. |
| 5,044,107 | A | 9/1991 | Holford |
| 5,479,149 | A | 12/1995 | Pike |
| 5,525,966 | A | 6/1996 | Parish |
| 5,598,151 | A | 1/1997 | Torii, Jr. |
| 6,070,355 | A | 6/2000 | Day |
| 6,363,647 | B2 | 4/2002 | Kaminski |
| 6,429,769 | B1 | 8/2002 | Fulgueira |
| 6,556,245 | B1 | 4/2003 | Holmberg |
| 6,580,876 | B1 | 6/2003 | Gordon |
| 6,735,897 | B1 | 5/2004 | Schmitter et al. |
| 6,802,147 | B2 | 10/2004 | Haefeli et al. |
| 6,823,621 | B2 | 11/2004 | Gotfried |
| 8,339,257 | B2 | 12/2012 | Cazanas et al. |
| 8,496,480 | B2 | 7/2013 | Guissin |
| 8,690,460 | B2 | 4/2014 | Kuehl et al. |
| 8,978,539 | B2 | 3/2015 | Teetzel et al. |
| D738,455 | S | 9/2015 | Homem de Mello Anderson et al. |
| D749,184 | S | 2/2016 | Sakiewicz et al. |
| 9,591,255 | B2 | 3/2017 | Sakiewicz et al. |
| 10,469,792 | B2 | 11/2019 | Sakiewicz et al. |
| 10,911,712 | B2 * | 2/2021 | Sakiewicz ............. H04N 5/77 |
| 2006/0025078 | A1 | 2/2006 | Sinha et al. |
| 2006/0042142 | A1 | 3/2006 | Sinha |
| 2006/0082730 | A1 | 4/2006 | Franks |
| 2008/0060248 | A1 | 3/2008 | Pine et al. |
| 2012/0276954 | A1 | 11/2012 | Kowalsky |
| 2012/0307989 | A1 | 12/2012 | Hawley et al. |
| 2013/0247440 | A1 | 9/2013 | Maentymaa |
| 2014/0250753 | A1 | 9/2014 | Kotliarov et al. |
| 2014/0317988 | A1 | 10/2014 | Battis et al. |
| 2015/0113851 | A1 | 4/2015 | Bensayan et al. |
| 2015/0184978 | A1 | 7/2015 | Hedeen |
| 2015/0198406 | A1 | 7/2015 | Ling |
| 2015/0369554 | A1 | 12/2015 | Kramer |

OTHER PUBLICATIONS

Notice of Allowance for U.S. Appl. No. 14/804,049, dated Dec. 7, 2016, 5 pages.
Notice of Allowance for U.S. Appl. No. 29/946,957, dated Sep. 17, 2015, 7 pages.
Official Action for U.S. Appl. No. 15/426,179, dated Jan. 10, 2019 18 pages.
Notice of Allowance for U.S. Appl. No. 15/426,179, dated Jun. 27, 2019 10 pages.
Official Action for U.S. Appl. No. 16/673,671, dated May 14, 2020, 22 pages.
Notice of Allowance for U.S. Appl. No. 16/673,671, dated Sep. 30, 2020, 10 pages.
U.S. Appl. No. 29/496,957, filed Jul. 18, 2014, now U.S. Pat. No. D 749,184.
U.S. Appl. No. 14/804,049, filed Jul. 20, 2015, now U.S. Pat. No. 9,591,255.
U.S. Appl. No. 15/426,179, filed Feb. 7, 2017, now U.S. Pat. No. 10,469,792.
U.S. Appl. No. 16/673,671, filed Nov. 4, 2019, now issued as U.S. Pat. No. 10/911,712.

* cited by examiner

EMERGENCY ASSISTANCE METHOD AND DEVICE FOR A FIREARM

CROSS-REFERENCE TO RELATED APPLICATIONS

This application is a continuation of U.S. patent application Ser. No. 16/673,671, filed Nov. 4, 2019, which is a continuation-in-part of U.S. patent application Ser. No. 15/426,179, filed Feb. 7, 2017, which is a continuation of U.S. patent application Ser. No. 14/804,049, filed Jul. 20, 2015, which claims priority under 35 U.S.C. § 119(e) to U.S. Provisional Patent Application Ser. No. 62/026,344 filed Jul. 18, 2014, which is incorporated herein in its entirety by reference.

FIELD OF INVENTION

This invention generally relates to firearms. More specifically, the present invention relates to an emergency assistance method and device for firearms.

BACKGROUND OF THE INVENTION

Firearms are popular in the United States and firearm purchases have increased significantly in recent years. The Federal Bureau of Investigation reports that 19,592,303 total background checks were processed by the National Instant Criminal Background Check System ("NICS") in 2012, compared to 11,177,335 checks in 2007. People purchase firearms for a variety of reasons including hunting, target shooting, collecting, and personal defense.

In the personal defense situation, a person may need to use a firearm to defend against a threat to his or her life. For example, in a home invasion scenario, events may unfold rapidly, and emergency services may not be able to respond before the threat materializes. Emergency services have different response times in different locations throughout the United States. Detroit's emergency manager Kevyn Orr stated that Detroit police take an average of 58 minutes to respond to a call versus a national average of 11 minutes. Thus, a person may require a firearm for personal defense and use deadly force if necessary.

Even when a person needs to use a firearm for personal defense, it is desirable to contact emergency services and authorities in an effort to have professionals intervene and address the threat. The traditional means to contact emergency services is through the 9-1-1 emergency telephone number. However, in some instances this requires use of a land line telephone. In a home invasion scenario, a person may not want to travel into another room and possibly alert the intruder. Even if the person has a cell phone available, he or she must still dial 9-1-1, then the person must hold the cell phone. These actions necessarily require the person to remove at least one hand from the firearm, which reduces the person's grip on the firearm and negatively impacts the accuracy and precision of the firearm.

Some firearms have integrated communications equipment. Rifles have been contemplated that integrate a radio antenna and other radio components. A description of radios integrated into rifles, pistols, and holsters or other communication means may be found in U.S. Pat. Nos. 2,990,471, 3,530,451, 4,936,037, 4,996,787, and 5,044,107, which are incorporated herein by reference in their entirety. A more modern take of the integrated, radio-enabled firearm detects when a discharge and communicates this information to a remote device. A description of this and similar devices may be found in U.S. Patent Publication No. 2006/0042142 and 2006/0025078, which are incorporated herein by reference in their entirety, and further similar devices may be found in U.S. Pat. Nos. 5,525,966, 5,598,151, 6,363,647, 6,429,769, 6,735,897, 6,802,147, 6,823,621, and 8,339,257, which are incorporated herein by reference in their entirety.

However, in order to utilize the radio communications in these devices, a firearm user would have to buy a firearm with a communication system already integrated into the firearm or hire a gunsmith to integrate a communication system into the firearm. Therefore, there is a need for a modular and adaptable communication system that does not require extensive modification of an existing firearm or the purchase of a new firearm.

Further, in personal defense situations, a person may desire to record audio and/or video of the incident for evidentiary or other purposes. The use of deadly force is a serious event. In a situation where a home invader was justifiably killed, a person would benefit from recording the audio and/or video of the home invasion to establish that the person properly defended himself or herself.

Prior art attempts to combine firearms with photographic systems have largely focused on systems that take photographs of the firearm's target, which is described in U.S. Pat. No. 1,955,300, which is incorporated herein by reference in its entirety. In particular, disclosed therein is a photographic attachment to a firearm that is operationally connected with the trigger of the firearm such that the discharge of the firearm actuates a camera to take a photograph of the target. When used with a revolver, each successive discharge of the firearm will advance film in the attachment and make successive photographs. The technology then progressed to moving pictures, and the motion picture mechanism is operated by the trigger finger of the person using the firearm. Such a device is described in U.S. Pat. No. 2,144,909, which is incorporated herein by reference in its entirety.

Further improvements to guns outfitted with cameras were disclosed in U.S. Pat. No. 2,282,680, which is incorporated herein by reference in its entirety. The improvements disclosed included a camera that may be affixed to a gun to photographically record its aim at the moment of discharge, the camera being activated by the recoil of the gun. Of particular interest, the camera disclosed therein is intended to be moved from gun to gun, and the camera shutter is adjustable, such that the camera activation may be made at various stages of recoil.

Additional incremental improvements may be found in U.S. Pat. No. 3,427,102 (camera actuating member located at the rearward end of the rifle stock, permitting a hunter or other shooter to actuate the camera by forcibly urging the rifle stock against his shoulder), U.S. Pat. No. 4,309,095 (a device comprising a set of brackets for supporting a conventional film camera to the telescopic sight of a firearm, and in particular a rifle), U.S. Pat. No. 4,835,621 (a video camera recording device attached to a structure resembling a rifle that can be raised to the shoulder and sighted at an object in much the same way that a gun is usually raised to the shoulder and aimed), U.S. Pat. No. 6,070,355 (a gun-mounted video camera including a gun, a video camera connected to the gun for accepting video images of a target of the gun and a display attached to the gun by a hinge), U.S. Pat. No. 6,556,245 (a video camera is provided which can be mounted to a firearm or a bow, primarily for recording game hunting, the camera having a quick release mount system that allows the video camera to slide onto and off of the weapon, the camera having a liquid crystal display so the hunter may monitor what the camera is recording), U.S. Pat.

No. 6,580,876 (a telescopic rifle scope/sight that is fully integrated with a compact digital camera, and an alternative embodiment where the invention eliminates the telescopic rifle scope, but maintains the compact digital camera), U.S. Patent Publication No. 2012/0276954 (a portable camera and surveillance device), and U.S. Pat. No. 8,690,460 (a camera phone mount for a weapon scope), which are incorporated herein by reference in their entirety.

With respect to audio, the prior art has conceived of a microphone on the person's belt that begins to record audio when the pistol is removed from its holster. A description of this device and other similar devices may be found in U.S. Pat. No. 5,479,149, which is incorporated herein by reference in its entirety. However, recording audio from the waist of a person is not optimized to record the audio of a conversation between a home owner and an intruder because the microphone is not positioned between the home owner and the intruder, and an item such as clothing may cover the microphone and obstruct any audio recording.

An audio/visual recording device may be found in U.S. Patent Publication Nos. 2006/0082730, 2008/0060248, and 2015/0198406, which are incorporated herein by reference in their entirety; and U.S. Pat. Nos. 8,496,480 and 4,309,095, which are incorporated herein by reference in their entirety. However, the device in the '730 publication requires the device to be disposed on the top of the firearm to record both downrange and the person wielding the firearm. A device that is mounted on top of a firearm necessarily obstructs the user's field of view. Even when the device is mounted to the side of the firearm's sight, a user's field of view is still limited and there is an increased likelihood that a user will miss cues from the environment, including threats to the user's health. The device in the '248 publication is limited to peer-to-peer network due to security issues, and thus a user may not transmit an emergency call or audio/visual data across a cell phone network. Therefore, there is a need for an audio/visual recording device that does not disrupt the field of view of the person and that may transmit data on any network to any user or remote device.

SUMMARY OF THE INVENTION

It is thus an aspect of embodiments of the present invention to provide an emergency assistance device for a firearm that enables a user to communicate with emergency services and allows the user to record audio and video of a personal defense situation. As mentioned above, a home defense scenario can take place at the most unexpected times. In the middle of the night, a crash downstairs may alert a user, who then reaches to the nightstand for a pistol. The user exits the bedroom without turning on any lights so as to not announce the user's presence to an intruder. At this point, the user is left searching in the dark for the source of the disturbance while the user's spouse or family is asleep in the house. The user needs every available advantage to help ensure a safe outcome for the user and the user's family. Embodiments of the present invention aid the user by providing an easy-to-use, inexpensive, and retrofittable emergency assistance device that is selectively connected to a firearm.

It is a further aspect of embodiments of the present invention to provide an emergency assistance device for a firearm that does not restrict the field of view of the user. The emergency assistance device may be located at a number of points on a firearm such that the user's field of view is not restricted. In some embodiments, the emergency assistance device is fixed to a picatinny rail, a weaver rail, or any other mounting means that is disposed underneath the barrel of the firearm. Many firearms in circulation already have a mounting means disposed in this location on the firearm as many accessories such as LASERs, flashlights, bayonets, etc. are disposed under the barrel. Therefore, embodiments of the present invention may be quickly affixed to the firearm without having to take the firearm to a gunsmith. Embodiments of the present invention may be disposed on the bottom portion of the firearm's magazine, trigger guard, or any other portion of the firearm that does not cause the emergency assistance device to restrict the field of view of the user.

It is another aspect of embodiments of the present invention to provide an emergency assistance device for a firearm that comprises a feature that initiates communication with emergency services. In some embodiments of the present invention the feature is a button, which may be disposed on any side of the device such that the person has easy access to the button without removing both of his or her hands from the firearm. In some embodiments, a button may be disposed on one side of the emergency assistance device for right-handed users and other left-handed versions may have a button disposed on the opposite side of the emergency assistance device for left-handed users, and still others may have both left and right buttons. Further, the feature may comprise color-coding or lights to provide a luminal signal to the user. In one example, the feature glows in the dark to help the user locate the feature is dimly-lit conditions or conditions completely without light. One skilled in the art will appreciate further features that may initiate communication with emergency services including, but not limited to, switches, infrared sensors, voice-activated sensors, etc.

It is a further aspect of some embodiments to provide an emergency assistance device for a firearm that reduces, if not prevents, accidental communication with emergency services. In the embodiments where a button initiates communication with emergency services, the button may be recessed from the surface of the emergency assistance device to limit accidental communication with emergency services. Similarly, in some embodiments, a protrusion on the surface of the emergency assistance device may be disposed around the perimeter of the button; again, to reduce or prevent accidental communication with emergency services (e.g., the button is recessed in relation to its surrounding surface). One skilled in the art will appreciate preventative features that may be applied to other features that initiate communication with emergency services. For example, a sensor may be disposed in the handle or stock of a firearm to detect when a firearm is being handled by a user. Only then will a voice-activated command initiate communication with emergency services. Thus, when the firearm is holstered or otherwise inert, common conversation will not accidentally or inadvertently trigger a voice-activated feature to initiate communication with emergency services.

It is another aspect of certain embodiments of the present invention to provide an emergency assistance device for a firearm that comprises a receiver, transmitter, and/or transceiver to wirelessly communicate with other devices and/or emergency services. Existing wireless communication via cell phones is known in the art. With cell phone technology, there are many methods to communicate with a cell phone tower or base transceiver station. These methods include frequency division multiple access ("FDMA") where different radio telephones each have a unique pair of frequencies for transmissions in the transmit and receive directions, time division multiple access ("TDMA") where each radio telephone has a unique time slot on a first shared frequency for communication in one direction, and a second unique time slot on a second shared frequency for communication in the other direction, and code division multiple access ("CDMA") which allows multiple users to transmit across multiple frequencies. More modern standards include LTE, LTE Advanced, WiMAX, and future 5G networks. One skilled in the art will appreciate that cell phone technology is not the only wireless means for an emergency device to wirelessly communicate with emergency services. This includes, but is not limited to, distress radiobeacons that operate on analog 121.5 MHZ and/or digital 406 MHz.

In some embodiments of the present invention, a mobile electronic device such as a cellular phone may be employed to establish electronic communication with a base transceiver station and a remote user. The emergency assistance device can send an emergency signal to a cellular phone, which in turn establishes electronic communication with a remote user such as 9-1-1. A first protocol may be utilized to establish an electronic communication between the emergency assistance device and the mobile electronic device. Then, a second protocol may be utilized to establish an electronic communication between the mobile electronic device and another device such as a base transceiver station, which may in turn relay an emergency signal from the emergency assistance device to a remote user such as a 9-1-1 emergency service.

It is a further aspect of some embodiments of the present invention to provide an emergency assistance device for a firearm wherein the communication between the assistance device and emergency services is routed to a public-safety answering point. For example, dialing 9-1-1 on a cell phone in the United States will cause the communication to be routed to a local emergency center. Further, the Federal Communications Commission requires all wireless service providers to transmit all 9-1-1 calls to a public-safety answering point, regardless of whether the caller subscribes to the provider's service or not. Thus, in some embodiments of the present invention, the emergency assistance device is in cellular communication with a cellular network, and engagement of a feature initiates communication with emergency services, which is then routed to a public-safety answering point. Further yet, some embodiments transmit data to emergency services indicating that the transmission is coming from a firearm or transmit a pre-recorded message from the user. Thus, any responding emergency services may act accordingly. One skilled in the art will appreciate other means to contact emergency services or any other remote service or person during an emergency. A further description of a public-safety answering point service may be found in U.S. Patent Publication No. 2012/0307989, which is incorporated herein by reference in its entirety.

It is another aspect of some embodiments of the present invention to provide an emergency assistance device for a firearm that may contact any number of remote users. In some embodiments described herein, the emergency assistance device contacts emergency services via a public-safety answering point. However, in some defensive scenarios it may be more expedient to contact others. For example, in a rural location, activation of a feature speed dials the nearest neighbor. In further embodiments, activation of the feature initiates communication with a National Park's dispatch center, a friend, a fire station, or other similar recipient. In yet further embodiments, a user may pre-program a plurality of remote users to contact with the emergency assistance device. In some instances a user may encounter a busy signal when contacting a remote user, or the remote user may simply not answer. In situations like these, the user may cycle to and attempt to contact the next remote user. Thus, in one embodiment, the user's closest neighbor is the first remote user, and 9-1-1 is the second remote user. One skilled in the art will appreciate additional embodiments of the present invention that users any combination of feature and remote user.

It is a further aspect of certain embodiments of the present invention to provide an emergency assistance device for a firearm that comprises a receiver for gathering position data. For instance, the global positioning system ("GPS") is a satellite-based positioning system that allows anyone with a GPS receiver and a line-of-sight to four or more GPS satellites to pinpoint his or her location. An emergency assistance device comprising a receiver for gathering position data may transmit said position data to a remote location when a user engages the emergency assistance device. Therefore, in some modes the emergency assistance device may operate as a distress beacon when it is too dangerous for a user to talk out loud. In one embodiment, the user may activate a button that simply transmits position data to a public-safety answering point so that emergency services may be deployed to the location of the position data. One skilled in the art will appreciate that GPS is not the only source of position data. Other positioning systems include, but are not limited to, the Galileo system in the European Union, LORAN, Glonass, India's Indian Regional Navigational Satellite System, China's Compass navigation system, cellular telephone tower triangulation or trilateration, and other equivalent systems.

It is another aspect of various embodiments of the present invention to provide an emergency assistance device that comprises an antenna, a power source, and a computer. A computer may include a processor (e.g., a central processing unit (CPU) and/or other suitable processor(s)) and memory (e.g., random access memory (RAM), read only memory (ROM), and the like). The computer also may include a non-transitory cooperating module/process and/or various input/output devices (e.g., a user input device (such as a keyboard, a keypad, a mouse, a microphone, an audio and/or visual recording devices and the like), a user output device (such as a display, a speaker, and the like), an input port, an output port, and storage devices (e.g., a tape drive, a floppy drive, a hard disk drive, a compact disk drive, and the like).

It will be appreciated that the functions depicted and described herein may be implemented in software (e.g., via implementation of software on one or more processors) and/or hardware (e.g., using a general purpose computer, one or more application specific integrated circuits (ASIC), and/or any other hardware equivalents). It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents). In one embodiment, the cooperating process can be loaded into memory and executed by processor to implement functions as discussed herein. Thus, cooperating process (including associated data structures) can be stored on a computer readable storage medium, e.g., RAM memory, magnetic or optical drive or diskette, and the like. One skilled in the art will appreciate various combinations of computer components.

It is a further aspect of some embodiments of the present invention to provide an emergency assistance device for a firearm that allows for two-way communication between the emergency assistance device and a remote device. In one embodiment of the present invention, the emergency assistance device comprises a microphone and a speaker. Once communication has been established with a remote device, the microphone allows the user to transmit vocalizations to the remote device, and the speaker allows the user to receive vocalizations from the remote device. One skilled in the art will appreciate that audio is not the only form of two-way communication between an emergency assistance device for a firearm and a remote device. In a further embodiment, the emergency assistance device comprises a display and a video recording device such as a camera. This allows for a two-way visual communication. The type of display may include, but is not limited to, Eidophor, Electroluminescent display (ELD), Electronic paper such as E Ink or Gyricon, Light emitting diode display (LED), Cathode ray tube (CRT) (Monoscope) Liquid-crystal display (LCD) such as TFT LED, Blue Phase, or IPS, Plasma display panel (PDP) ALiS, Digital Light Processing (DLP), Liquid crystal on silicon (LCoS), Organic light-emitting diode (OLED) AMOLED, Organic light-emitting transistor (OLET), Surface-conduction electron-emitter display (SED), Field emission display (FED), Laser TV such as Quantum dot or Liquid crystal, MEMS display such as IMoD, TMOS, or DMS, Quantum dot display (QD-LED), Ferro liquid display (FLD), Thick-film dielectric electroluminescent technology (TDEL), Telescopic pixel display (TPD), or Laser Phosphor Display (LPD). The type of camera may be cameras known in the art including, but not limited to, plate cameras, large-format cameras, medium-format cameras, folding cameras, box cameras, rangefinder cameras, single-lens reflex, twin-lens reflex, subminiature cameras, instant picture cameras, and cine cameras.

It is a further aspect of certain embodiments of the present invention to provide an a remote device in communication with the emergency assistance device, wherein the remote device comprises a transceiver; a touch-screen display; and a processor configured to: generate an icon on the touch-screen display; in response to a user initiation on the touch-screen display associated with an icon, provide on the touch-screen display a plurality of icons representing functions; in response to the user actuation of a first function of the plurality of functions, sending a command to a camera via the transceiver requesting video data from the camera and recover video data from the camera via the transceiver; and generate an image on the touch-screen display based on the video data. In a further embodiment, the remote device comprises a first transceiver; a touch-screen display; a processor; and an external display device, which further comprises a second transceiver; wherein the processor is configured to: generate an icon on the touch-screen display; in response to a user initiation on the touch-screen display associated with the icon, provide on the touch-screen display a plurality of icons representing functions; in response to the user actuation of a first function of the plurality of functions, send a command to a camera via the first transceiver requesting video data from the camera; in response to the command requesting video data, the camera sends video data via the second transceiver and generates an image on the externally display device based on the video data. In yet a further embodiment, the remote device comprises a transceiver; a touch-screen display; and a processor configured to: generate an icon on the touch-screen display; in response to a user initiation on the touch-screen display associated with the icon, provide on the touch-screen display a plurality of icons representing functions; in response to the user actuation of a first function of the plurality of functions, send a command to a plurality of cameras via the transceiver requesting video data from the plurality of cameras and recover video data from the plurality of cameras via the transceiver; and generate one or more images on the touch-screen display based on the video data from the plurality of cameras.

It is a further aspect of various embodiments of the present invention to provide an emergency assistance device for a firearm that allows for communication beyond visual and audio means. For example, in one embodiment of the present invention the emergency assistance device may comprise haptic technology such as a vibrating device. The haptic device allows a user to receive communication from a remote device such as Morse code. Similarly, embodiments of the present invention may include a feature such as a button for transmitting communications to a remote device. The user may engage a button to transmit Morse code (or another type of code or signal) to a remote device and/or emergency services when speaking or recording video is not possible. One skilled in the art will appreciate that haptic technology is not the only sense through which a user may communicate to a remote device. In a further embodiment, the emergency device may include a heating element and/or a thermoelectric cooler or refrigeration loop to communicate via temperature gradients. In yet a further embodiment, the emergency device may include a device that produces an odor to communicate via olfactory senses. In another embodiment, the emergency device may include a keyboard.

It is a further aspect of some embodiments of the present invention to provide an emergency assistance device for a firearm that records and stores data. As described above, embodiments of the present invention may transmit and/or receive a variety of data. In some embodiments of the present invention, the emergency assistance device may comprise computer data storage, or memory, to record some or all of the different types of data that pass through the emergency assistance device. Examples of types of memory include, but are not limited to, volatile memory such as DRAM, SRAM, TRAM, and ZRAM, and non-volatile memory types such as Mask ROM, PROM, EPROM, EEPROM, Flash Memory, nvSRAM, FeRAM, MRAM, PRAM, Magnetic tape, hard drive, Optical drive, CBRAM, SONOS, RRAM, Racetrack memory, NRAM, Millipede memory, and FJG.

It is a further aspect of certain embodiments of the present invention to provide an emergency assistance device for a firearm wherein an emergency assistance device includes a processor and a memory, where the processor is configured to initiate a call from a user device supporting a media content capture capability, receive, at the user device, a request for establishment of a data session between the user device and a multimedia answering point, and propagate media content captured at the user device toward the multimedia answering point via the data session. In one embodiment, a method includes using a processor and a memory for initiating a call from a user device supporting a media content capture capability, receiving, at the user device, a request for establishment of a data session between the user device and a multimedia answering point, and propagating media content captured at the user device toward the multimedia answering point via the data session. In one embodiment, a computer readable storage medium stores instructions which, when executed by a processor, cause the processor to perform such a method.

It is a further aspect of some embodiments of the present invention to provide an emergency assistance device for a firearm wherein an emergency assistance device includes a processor and a memory, where the processor is configured to receive call signaling indicative of a call initiated from a user device, determine whether the user device supports a media content capture capability, and determine routing of the call signaling based on the determination as to whether the user device supports a media content capture capability. In one embodiment, a method includes using a processor and a memory for receiving call signaling indicative of a call initiated from a user device, determining whether the user device supports a media content capture capability, and determining routing of the call signaling based on the determination as to whether the user device supports a media content capture capability. In one embodiment, a computer readable storage medium stores instructions which, when executed by a processor, cause the processor to perform such a method.

It is a further aspect of various embodiments of the present invention to provide an emergency assistance device for a firearm wherein an emergency device includes a processor and a memory, where the processor is configured to receive, at a multimedia answering point, call signaling indicative of a call initiated from a user device, and initiate establishment of a data session configured for propagating media content from the user device toward the multimedia answering point. In one embodiment, a method includes using a processor and a memory for receiving, at a multimedia answering point, call signaling indicative of a call initiated from a user device, and initiating establishment of a data session configured for propagating media content from the user device toward the multimedia answering point. In one embodiment, a computer readable storage medium stores instructions which, when executed by a processor, cause the processor to perform such a method.

It is a further aspect of some embodiments of the present invention to provide an emergency assistance device for a firearm wherein an emergency device includes a processor and a memory, where the processor is configured to receive a request to reestablish a data session between a multimedia answering point and a user device, wherein the data session is associated with a call initiated from the user device, and propagate signaling configured to request reestablishment of the data session between the multimedia answering point and the user device. In one embodiment, a method includes using a processor and a memory for receiving a request to reestablish a data session between a multimedia answering point and a user device, wherein the data session is associated with a call initiated from the user device and propagating signaling configured to request reestablishment of the data session between the multimedia answering point and the user device. In one embodiment, a computer readable storage medium stores instructions which, when executed by a processor, cause the processor to perform such a method.

While some embodiments of the invention may comprise data storage on the device itself, other embodiments contemplate remote storage of data. For example, in one embodiment of the present invention, an emergency assistance device for a firearm transmits data across a cell phone network to a remote server, wherein the remote server may store the data on any combination of the above-referenced memory types. In this embodiment, the emergency assistance device may be a smaller form factor since the emergency assistance device only needs to transmit data, not store data. In a further embodiment, an emergency assistance device may transmit data to another device on the user's person. This second device may be disposed on the user to save weight and space on the emergency assistance device itself. In this configuration, the second device may have a larger memory capacity or a more powerful transceiver to relay emergency calls.

It is a further aspect of certain embodiments of the present invention to provide an emergency assistance device for a firearm that has one or more modes of operation. Not all self defense situations are the same, and different situations may necessitate different modes of operation from the emergency assistance device. For example, if the user is hiking and encounters an animal that poses a threat, the user may enable a warning mode wherein the emergency assistance device emits a sound from one or more speakers. If an elk is posing a threat, then the sound may be a wolf howl, a bear vocalization, a false gunshot, etc. A warning mode may also include other means of warning. A luminal means of warning may be a flashing light, a thermal means of warning may be a pulsing heat source, an olfaction means of warning may be an odor, etc. In addition, self defense situations arise when other humans pose a threat. In order to deter another human, a warning sound might be a prerecorded message, which may be a recitation that the user feels threatened and is prepared to defend himself or herself. One skilled in the art will appreciate that a warning mode is not the only mode of operation that will be useful to a user. For example, another mode of operation for embodiments of an emergency assistance device for a firearm may include a stun mode, wherein the objective is to stun or temporarily disable a threat.

It is another aspect of various embodiments of the present invention to provide an emergency assistance device for a firearm wherein a remote user or device may monitor the use of the firearm. The firearm also has a transceiver that transmits at least the navigational data to the monitoring station. In one arrangement, the firearm can include a biometric identifier for identifying a user and a trigger mechanism in which the biometric identifier can enable the trigger mechanism only when the biometric identifier identifies an authorized user. The firearm can also have a trigger mechanism, and the transceiver can receive a disabling signal for disabling the trigger mechanism. The disabling signal can be selectively transmitted from the remote user or device. In one embodiment, the trigger mechanism can include a trigger, and the disabling signal can disable the trigger mechanism by causing the trigger to be immobilized. Additionally, the trigger mechanism can include a latch in which the latch can immobilize the trigger by selectively engaging the trigger.

It is a further aspect of some embodiments of the present invention to provide an emergency assistance device for a firearm wherein a biometric identifier can be a fingerprint verification device having a memory for storing digitized fingerprint images. The fingerprint verification device can generate digitized images of fingerprints and can compare the generated images with the fingerprint images stored in the memory to authorize use of the firearm. Moreover, the fingerprint verification device can have at least one fingerprint scanner on a handle of the firearm. The trigger mechanism can have a trigger and a latch selectively engageable with the trigger, and the biometric identifier can cause the latch to disengage the trigger when the biometric identifier identifies the authorized user. In another aspect, the firearm can include at least one sensor mechanism and a trigger mechanism in which the trigger mechanism can have a trigger and the sensor mechanism can have a pressure switch located on the trigger. The sensor mechanism can generate a signal when a user places a finger on the pressure switch on the trigger. Certain embodiments of the present invention also concern an intelligent firearm for firing a projectile. The firearm includes a tracking device in which the tracking device signals navigational data and has a transceiver. The transceiver transmits at least the navigational data to a remote user or device. The intelligent firearm also contains several of the components listed above regarding the system for monitoring use of a firearm and interacts with one or more of the mechanisms described above as well.

It is another aspect of certain embodiments of the present invention to provide an emergency assistance device for a firearm wherein a user may select from one or more modes of operation. A user may enable a mode of operation in a number of ways. In one embodiment, a single button on the emergency assistance device may provide a general warning. In another embodiment, a user may cycle through a plurality of modes by repeatedly pressing a button until the desired mode is selected. In a further embodiment, the emergency assistance device comprises a plurality of buttons such that a user does not have to cycle through a list of modes, but instead, simply selection a button to push or toggle. Thus, in one example an emergency assistance device comprises a warning button for animals and a warning button for humans, thus providing different pre-fire sounds dependent on the target. In yet a further embodiment, the emergency assistance device is programmable such that a user may download various modes and program which buttons correspond to which modes. Thus, a user may download a warning for a brown bear and assign that warning to a particular button on the emergency assistance device. Further, the user may download a stun mode for a human on another button on the emergency device. Beyond ad hoc downloads of different modes, a user may also download a suite of modes. For example, if a user is visiting Yellowstone National Park, he or she may download a specific suite of modes for the particular wildlife in that area. As noted elsewhere herein, embodiments of the present invention are not limited to buttons and may include switches, infrared sensors, voice-activated sensors, etc.

It is another aspect of various embodiments of the present invention to provide an emergency assistance device for a firearm that comprises a weapon. Firearms have a longstanding tradition of comprising lugs for bayonet attachment. Embodiments of the present invention may include a lug for a bayonet or may integrate a knife, bayonet, spike or any other weapon into the housing of the emergency assistance device. One skilled in the art will appreciate other accessories that are commonly included on a picatinny rail, weaver rail, or other mounting means. These accessories may include, but are not limited to, additional rails or mounting means, vertical foregrips, flashlight mounts, bipod adapter, quick detach sling mounts, LASERs, flashlights, magazine well grip, etc.

A specific embodiment of the present invention is an emergency assistance device selectively interconnected to a firearm comprising a housing having a firearm mount disposed on the outer surface of the housing; an antenna at least partially disposed within the housing; a transceiver disposed in the housing, the transceiver for transmitting wireless communication signals to enable wireless communication through a wireless communication network; and a feature disposed on the outer surface of the housing, wherein activation of the feature causes the transceiver to transmit wireless communication signals.

In one preferred embodiment, a slide-on attachment to an existing picatinny rail on a handgun includes the following: wireless communication through a cell phone network; a transceiver that transmits wireless signals that are routed to a public-safety answering point; a button, a switch, an infrared sensor, and/or a voice-activated sensor that, upon activation, causes the transceiver to transmit wireless communication signals, a camera having a focal direction oriented parallel with a longitudinal axis of the firearm, and a receiver for gather position data.

Yet another embodiment of the present invention is an emergency assistance device for a firearm, comprising a housing having a mounting feature disposed on a first surface of the housing, the mounting feature adapted to selectively interconnect to a firearm; a first camera disposed on a second surface of the housing; a first light source disposed on the second surface of the housing; a transceiver disposed in the housing, the transceiver configured to emit an emergency signal; an activation feature, wherein engagement of the activation feature causes at least one of (a) the first camera to record a video; (b) the first light source to emit a light; and (c) the transceiver to emit the emergency signal.

A further embodiment of the present invention is a system for transmitting an emergency signal from a firearm to a remote user, comprising a firearm having a first mounting feature; an emergency assistance device, comprising a second mounting feature configured to selectively interconnect to the first mounting feature of the firearm; a transceiver configured to emit an emergency signal; an activation feature, wherein engagement of the activation feature causes the transceiver to emit the emergency signal; and a remote user having a second transceiver configured to receive the emergency signal emitted from the transceiver of the emergency assistance device.

One embodiment of the present invention is an emergency assistance device for a firearm, comprising a housing having a mounting feature disposed on a top surface of the housing; a recess disposed on the housing, wherein the recess corresponds to a trigger guard of a firearm, a camera disposed on a front surface of the housing, the camera configured to record a video, a first microphone disposed on the front surface of the housing, wherein the first microphone is configured to record a sound that corresponds to the recorded video of the camera; a light source disposed on the front surface of the housing; a transceiver disposed in the housing, the transceiver configured to emit an emergency signal; a second microphone disposed on a side surface of the housing, wherein the second microphone is configured to record a sound and send a corresponding audio signal to the transceiver; a speaker disposed on the side surface of the housing, wherein the transceiver sends a second audio signal to the speaker and the speaker generates a corresponding second sound; a an activation feature, wherein engagement of the activation feature causes at least one of (a) the camera to record the video; (b) the light source to emit a light; and (c) the transceiver to emit the emergency.

It is a further aspect of embodiments of the present invention to provide a method for transmitting an emergency signal from a firearm to a remote user, comprising: (a) providing a firearm having a picatinny rail and a handle; (b) providing an emergency assistance device having a picatinny channel, a button, a camera, and a transceiver; (c) mounting the picatinny channel of the emergency assistance device to the picatinny rail of the firearm; (d) gripping the handle of the firearm; (e) engaging the button of the emergency assistance device without releasing the grip of the handle of the firearm to activate the camera and to cause the transceiver to emit an emergency signal using a first protocol; (f) receiving, by a mobile electronic device, the emergency signal from the emergency assistance device, wherein the mobile electronic device emits the emergency signal using a second protocol; (g) receiving, by a transceiver base station, the emergency signal from the mobile electronic device, wherein the transceiver base station emits the emergency signal using a third protocol; (h) receiving, by a remote user, the emergency signal from the transceiver base station signaling an emergency by the firearm user. In some embodiments of the invention, the first protocol is a Bluetooth protocol.

It is yet another aspect of embodiments of the present invention to provide a method for transmitting an emergency signal from a firearm to a remote user, comprising: (a) providing a firearm having a picatinny rail and a handle; (b) providing an emergency assistance device having a housing having a picatinny channel disposed on a top surface of the housing; a recess disposed on the housing, wherein the recess is adapted to engage a trigger guard of the firearm; a camera disposed on a front surface of the housing, the camera configured to record a video; a first microphone disposed on the front surface of the housing, wherein the first microphone is configured to record a sound that corresponds to the recorded video of the camera; a light source disposed on the front surface of the housing; a transceiver disposed in the housing, the transceiver configured to emit an emergency signal; and a button; (c) mounting the picatinny channel of the emergency assistance device to the picatinny rail of the firearm; (d) gripping the handle of the firearm; (e) engaging the button of the emergency assistance device without releasing the grip of the handle of the firearm to activate the camera, the microphone, and the light source, and to cause the transceiver to emit the emergency signal using a first protocol; (f) receiving, by a mobile electronic device, the emergency signal from the emergency assistance device, wherein the mobile electronic device emits the emergency signal using a second protocol; (g) receiving, by a transceiver base station, the emergency signal from the mobile electronic device, wherein the transceiver base station emits the emergency signal using a third protocol; and (h) receiving, by a remote user, the emergency signal from the transceiver base station signaling an emergency by the firearm user.

Yet another specific embodiment is an emergency assistance device for a firearm, comprising a housing having a mounting feature disposed on a first surface of the housing, the mounting feature adapted to selectively interconnect to a firearm; a first camera and a microphone disposed on a second surface of the housing; a first light source disposed on the second surface of the housing; a transceiver disposed in the housing, the transceiver configured to emit an emergency signal; an activation feature configured to move between a first position and a second position and configured to be retained in the first position and retained in the second position, wherein movement of the activation feature out of retainment in the first position, from the first position to the second position, and into retainment in the second position causes at least one of: the first camera to record a video, wherein the microphone is configured to record a sound that corresponds to the recorded video of the first camera; the first light source to emit a light; and the transceiver to emit the emergency signal; and a speaker disposed on a third surface of the housing, wherein the transceiver sends an audio signal to the speaker and the speaker generates a corresponding sound.

In some embodiments, the device further comprises a second microphone disposed on a third surface of the housing, wherein the microphone is configured to record the sound that corresponds to the recorded video of the first camera. In various embodiments, the device further comprises a sound device that compares an aspect of the sound as recorded by the first microphone to the aspect of the sound as recorded by the second microphone. In some embodiments, the device further comprises a wireless network having a base transceiver station configured to receive the emitted emergency signal from the emergency assistance device, wherein the base transceiver relays the emergency signal to a remote user.

In various embodiments, the device further comprises a channel extending into a side of the housing, wherein the channel has two upper portions extending in one direction and a lower portion extending in another direction, wherein the lower portion joins the upper portions together; and a pin extending from the activation feature and into the channel, wherein the pin is positioned in one upper portion when the activation feature is retained in the first position, wherein the pin moves along the lower portion as the activation feature moves from the first position to the second position, and wherein the pin is positioned in the other upper portion when the activation feature is retained in the second position. In some embodiments, the device further comprises a bias member positioned between the activation feature and the housing to retain the activation member in the first position and the second position. In various embodiments, the emergency assistance device further comprises a button on the emergency assistance device to cause the transceiver to emit the emergency signal. In some embodiments, the activation feature is a slide button.

Another particular embodiment is an emergency assistance device for a firearm, comprising a housing having a mounting feature disposed on a first surface of the housing, the mounting feature adapted to selectively interconnect to a firearm; a first camera disposed on a second surface of the housing; a first light source disposed on the second surface of the housing; a second light source disposed on a third surface of the housing; a transceiver disposed in the housing, the transceiver configured to emit an emergency signal; an activation feature configured to move between a first position and a second position and configured to be retained in the first position and retained in the second position, wherein movement of the activation feature out of retainment in the first position, from the first position to the second position, and into retainment in the second position causes at least one of: the first camera to record a video; the first light source to emit a light; and the transceiver to emit the emergency signal; and a second camera disposed on the third surface of the housing, wherein the first camera has a first recordation field and the second camera has a second recordation field, wherein at least a portion of the first recordation field overlaps at least a portion of the second recordation field.

In various embodiments, a receiver disposed in the housing gathers position data of the emergency assistance device from at least one of a Global Positioning System, a Galileo system, a LORAN system, a Glonass system, an Indian Regional Navigation Satellite System, a Chinese Compass navigation system, and a cell phone tower. In some embodiments, the device further comprises a microphone disposed on the second surface of the housing, wherein the microphone is configured to send a corresponding audio signal to the transceiver. In various embodiments, the housing comprises a recess that corresponds to a trigger guard of the firearm. In some embodiments, the emergency assistance device further comprises a button on the emergency assistance device to cause the transceiver to emit the emergency signal. In various embodiments, the device further comprises a channel extending into a side of the housing, wherein the channel has two upper portions extending in one direction and a lower portion extending in another direction, wherein the lower portion joins the upper portions together; and a pin extending from the activation feature and into the channel, wherein the pin is positioned in one upper portion when the activation feature is retained in the first position, wherein the pin moves along the lower portion as the activation feature moves from the first position to the second position, and wherein the pin is positioned in the other upper portion when the activation feature is retained in the second position.

A further particular embodiment is a system for transmitting an emergency signal from a firearm to a remote user, comprising a firearm having a first mounting feature; an emergency assistance device, comprising: a second mounting feature configured to selectively interconnect to the first mounting feature of the firearm; a first transceiver configured to emit an emergency signal; an activation feature configured to move between a first position and a second position and configured to be retained in the first position and retained in the second position, wherein movement of the activation feature out of retainment in the first position, from the first position to the second position, and into retainment in the second position causes the first transceiver to emit the emergency signal; a channel extending into a side of the housing, wherein the channel has two upper portions extending in one direction and a lower portion extending in another direction, wherein the lower portion joins the upper portions together; a pin extending from the activation feature and into the channel, wherein the pin is positioned in one upper portion when the activation feature is retained in the first position, wherein the pin moves along the lower portion as the activation feature moves from the first position to the second position, and wherein the pin is positioned in the other upper portion when the activation feature is retained in the second position; a second transceiver configured to receive the emergency signal emitted from the first transceiver of the emergency assistance device, the second transceiver possessed by the remote user; and a speaker disposed on the emergency assistance device, wherein the speaker is configured to receive an audio signal from the second transceiver and generate a corresponding sound.

In some embodiments, the channel comprises a third upper portion and a second lower portion, and a second pin extends from the activation feature into the channel, wherein the second pin is positioned in the other upper portion when the activation feature is retained in the first position, wherein the second pin moves along the second lower portion as the activation feature moves from the first position to the second position, and wherein the second pin is retained in the third upper portion when the activation feature is retained in the second position. In various embodiments, the device further comprises a light source disposed on the front surface of the emergency assistance device. In some embodiments, the system has at least two modes of operation, wherein in a first mode of operation engagement of the activation feature causes the light source to emit light, wherein in a second mode of operation engagement of the activation feature causes the transceiver to emit the emergency signal. In various embodiments, the device further comprises a camera disposed on the front surface of the emergency assistance device. In some embodiments, the system has at least one mode of operation, wherein in a first mode of operation engagement of the activation feature causes the camera to record video, wherein in a second mode of operation engagement of the activation feature causes the first transceiver to emit the emergency signal.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

Other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and Detailed Description and no limitation as to the scope of the present invention is intended by either the inclusion or non-inclusion of elements, components, etc. in this Summary of the Invention. Additional aspects of the present invention will become more readily apparent from the Detailed Description particularly when taken together with the drawings.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to the illustrated and described below.

Further features and advantages will become apparent from the following, more detailed, description of the various embodiments of the invention(s), as illustrated by the drawings.

DETAILED DESCRIPTION OF THE INVENTION

As described in detail below, various embodiments of the present invention include an emergency assistance device. The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed.

Figure 1:
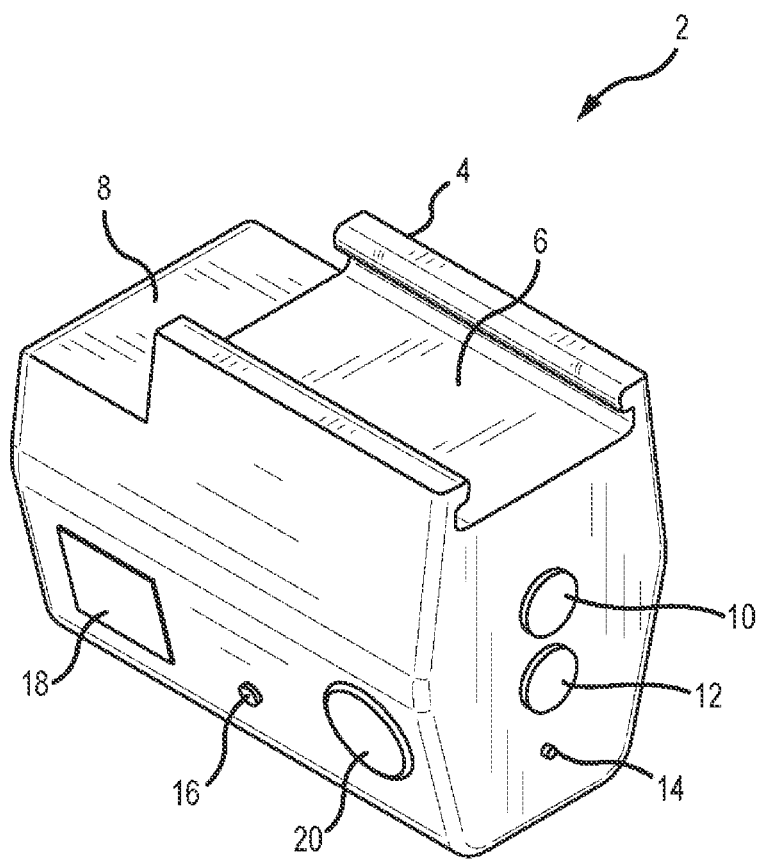
FIG. 1 depicts a perspective view of an emergency assistance device according to some embodiments of the present invention.
Figure 2:
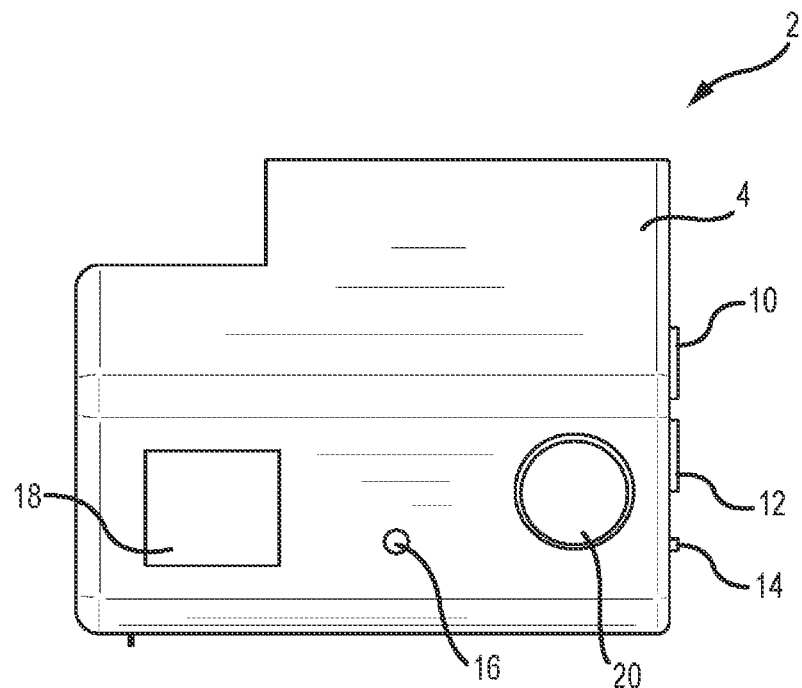
FIG. 2 depicts a left elevation view of the emergency assistance device of FIG. 1.
Figure 3:
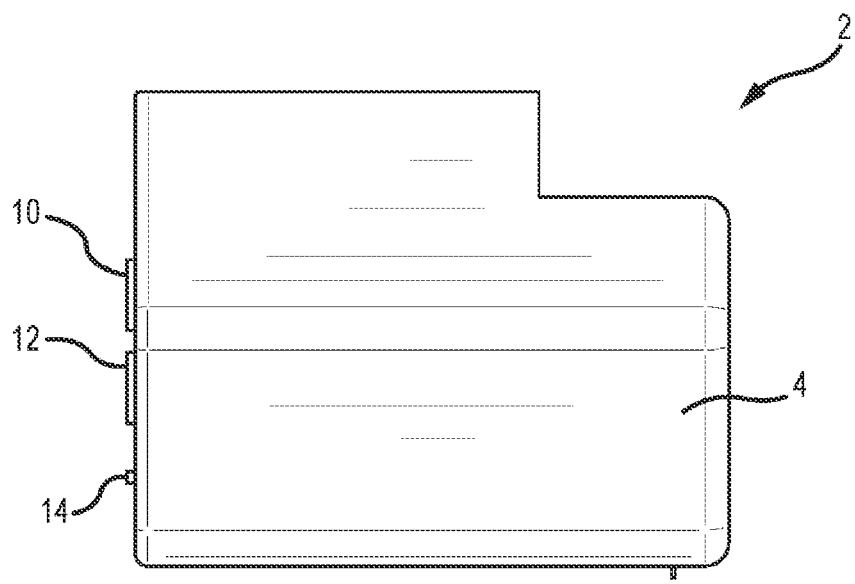
FIG. 3 depicts a right elevation view of the emergency assistance device of FIG. 1.
Figure 4:
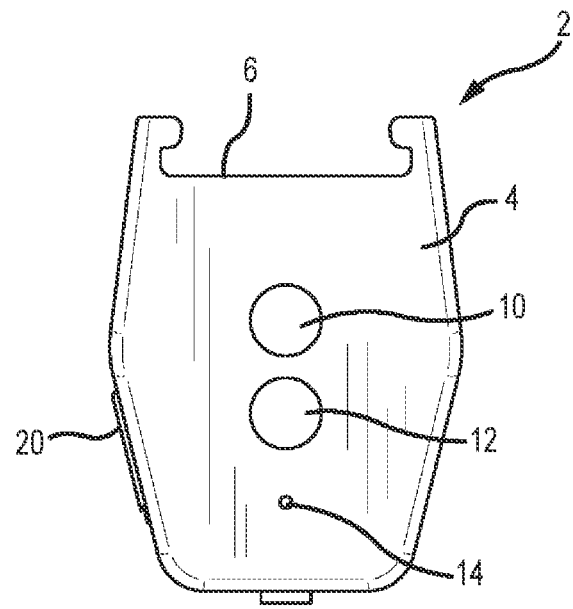
FIG. 4 depicts a front elevation view of the emergency assistance device of FIG. 1.
Figure 5:
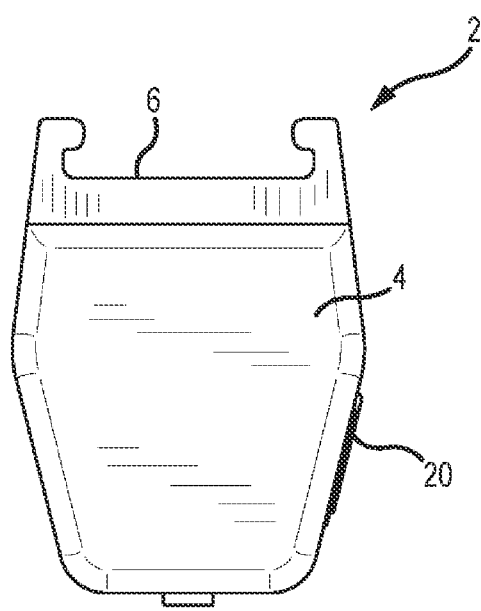
FIG. 5 depicts a rear elevation view of the emergency assistance device of FIG. 1.
Figure 6:
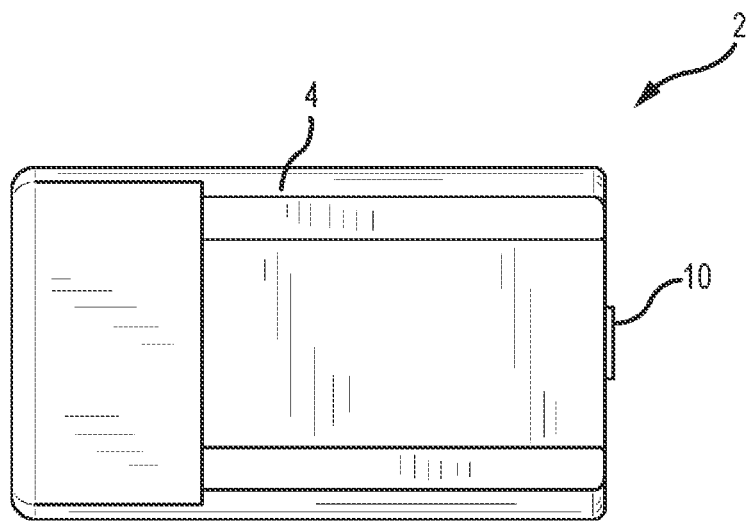
FIG. 6 depicts a top plan view of the emergency assistance device of FIG. 1.
Figure 7:
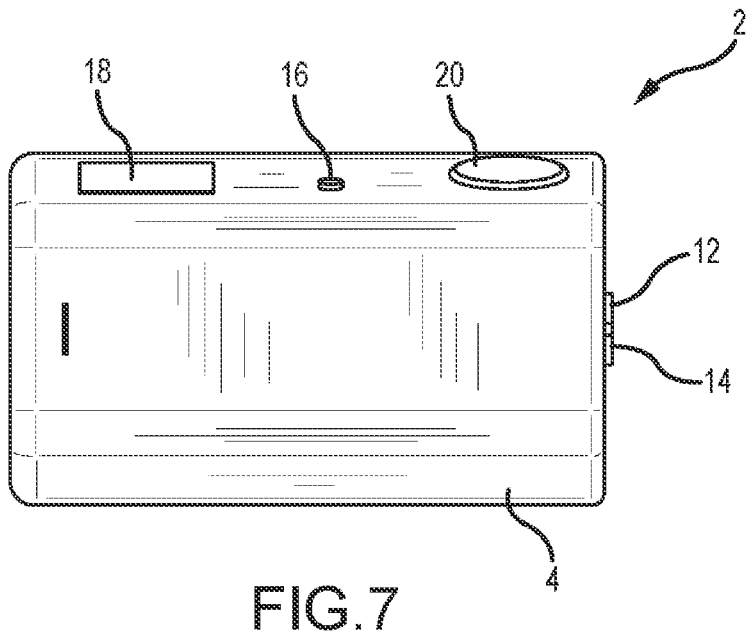
FIG. 7 depicts a bottom plan view of the emergency assistance device of FIG. 1.

FIGS. 1-7 depict various views of an emergency assistance device 2 that can be selectively mounted to a firearm. FIG. 1 is a perspective view of the emergency assistance device 2 with various features. First, the emergency assistance device 2 has a housing 4 that provides a location for many of the features to be disposed and also protects the more sensitive components of the device 2. In some embodiments, the housing 4 is made from injection molded plastic such as polyethylene and polystyrene. However, it will be appreciated that the housing 4 may also be made from other processes such as milling, stamping, casting, etc.

One surface of the housing 4 may comprise a mounting feature 6 that allows for the selective interconnection of the emergency assistance device 2 to a firearm or other weapon, e.g., a bow. One common type of selective interconnection used in the firearm industry is the picatinny rail system where one component has outwardly extending protrusions that correspond to channels in another component. One or both of the components has an engagement feature such as a thumb screw or a clamp that holds the two components in place. The mounting feature 6 of the emergency assistance device 6 may be a one of the two components in the picatinny rail system and may have an engagement feature to secure the emergency assistance device 2 to a firearm. However, it will be appreciated that other means of selective interconnection may be utilized by the mounting feature 6 as discuss elsewhere herein. For example, weaver mounts and quick disconnect couplings are frequently used in the firearm industry.

The mounting feature 6 of the emergency assistance device 2 in FIG. 1 is located on a top surface of the housing 4. Thus, in various embodiments, the emergency assistance device 2 will be mounted underneath a pistol's barrel and out of the user's field of view. A firearm typically has a sight on top of the weapon, and a user focuses on the sight when shooting. The human eye comprises a fovea centralis, which is an area of the eye that is densely packed with cones and provides the focus area of human vision. This focus area is approximately 2 degrees of visual angle. Thus, when a user is looking down the sight of a firearm, 2 degrees of visual angle may constitute a conical volume of space that is not obstructed by the emergency assistance device, which is mounted underneath the firearm in this embodiment.

Another aspect of mounting the emergency assistance device 2 is the forces experienced by the device 2 when the firearm is fired. The emergency device may be configured to abut the trigger guard that surrounds the trigger of the firearm in order to provide additional support to the emergency assistance device 2. By abutting the emergency assistance device 2 against the trigger guard or any other portion of the firearm, the emergency assistance device 2 has an even more secure attachment to the firearm.

To accommodate this abutment, the emergency assistance device 2 shown in FIG. 1 comprises a guard recess 8. This guard recess 8 provides more surface area for a trigger guard or other portion of the firearm to contact the emergency assistance device 2. Specifically, the guard recess 8 supports the emergency assistance device 2 along an axis that is parallel with an axis of the firearm's barrel. The increase in surface area provides more support for the emergency assistance device 2 as the firearm is used.

Some components of the emergency assistance device 2 are positioned on a front surface of the housing 4. First, a light source 10 is positioned on the front surface of the housing 4. The light source 10 may be a L.E.D. or any other light generating device. As shown in this embodiment, the light source 10 is positioned on a front surface of the housing, and the light source 10 is oriented in a forward direction of the emergency assistance device 2 to illuminate any target in front of the firearm. However, it will be appreciated that other embodiments of the invention have more than one light source 10, and the light source 10 or light sources 10 may be oriented in different directions.

When using a firearm in an emergency situation, it is advantageous to illuminate the target in front of the firearm. Yet, in some scenarios it may be advantageous to illuminate the immediate surroundings. Therefore, in some embodiments of the invention, a light source 10 may be disposed on any surface of the housing 4, including the left and right side surfaces of the housing 4, to illuminate the surrounding area. There may also be more than one light source located on the first surface of the housing 4 wherein each light source 10 is oriented in a different direction to illuminate the surrounding area.

A light source 10 may have a particular area or volume that the light source 10 is capable of effectively illuminating. In embodiments with multiple light sources 10, each light source 10 may have an effective illumination field where, for example, the emitted light retains 50% of the maximum luminosity of the light source 10. It will be appreciated that other definitions of the effective illumination field may include 90%, 80%, 70%, 60%, 40%, 30%, 20%, and 10% of the maximum luminosity of the light source 10. Thus, in some embodiments, the plurality of light sources 10 each have an effective illumination field wherein a portion of each illumination field overlaps with at least a portion of another illumination field.

Next, a camera 12 is disposed on the front surface of the housing 4 in FIG. 1. The camera 12 may be any device that records video and even audio in some embodiments. The camera 12 may be activated in a number of ways as described elsewhere herein. But in some embodiments, the camera 12 is activated when a user engages a button or other similar feature. The camera 12 may record the visual and audio data to a local memory device of the emergency assistance device 2. The recorded media may then be relayed to another location such as a remote server, or the recorded media may be recovered locally, for example, by a flash drive, a Bluetooth-enabled device, or other similar means.

Similar to the light source 10, more than one camera 12 may be disposed on the housing 4 of the emergency assistance device 2. Similar again, the camera 12 may have a particular recordation field, i.e., an area or volume that is capable of being recorded by the camera 12 at any one time. Multiple cameras 12, whether on one surface of the housing 4 or many, may each have a recordation field that has a portion that overlaps with at least a portion of another recordation field to provide a more complete video recordation of the surrounding area.

A microphone 14 may be disposed on the front surface of the housing 4 in FIG. 1. The microphone 14 may be used to capture audio of the surrounding area and used alone or in combination with other components, for example, an audio recordation feature of the camera 12. As with other components, multiple microphones 14 may be positioned on one or more surfaces of the housing 4. Since microphones 14 may capture sounds, having a plurality of microphones 14 may be useful to triangulate the direction of incoming sounds such as an incoming bullet. The microphones 14 may be positioned on multiple surfaces of the housing 4 or oriented in multiple directions. Therefore, depending on the intensity of an incoming sound, such as a bullet, the direction of the incoming sound may be discerned. Once the direction of the incoming object has been ascertained, the directional data may be coupled with GPS information and directional information within the emergency assistance device 2. Therefore, the direction of a sound such as an incoming object may be mapped to a global coordinate and directional system.

Further components of the emergency assistance device 2 may be positioned on a side surface of the housing 4. These components include a second microphone 16, a speaker 18, and a button 20. The button 20 may be used in various modes to engage one or more components of the emergency assistance device 2. For example, pressing the button 20 once may activate the light 10, the camera 12, and the first microphone 14. Pressing the button 20 a second time may activate a transceiver in the emergency device 2 wherein the transceiver emits an electronic emergency signal to establish a wireless communication with an emergency service. The second microphone 16 and the speaker 18 may allow for two way communication with a remote user such as a 9-1-1 operator.

FIGS. 2-7 depict various alternative views of the emergency assistance device 2 and its various components.

Figure 8:
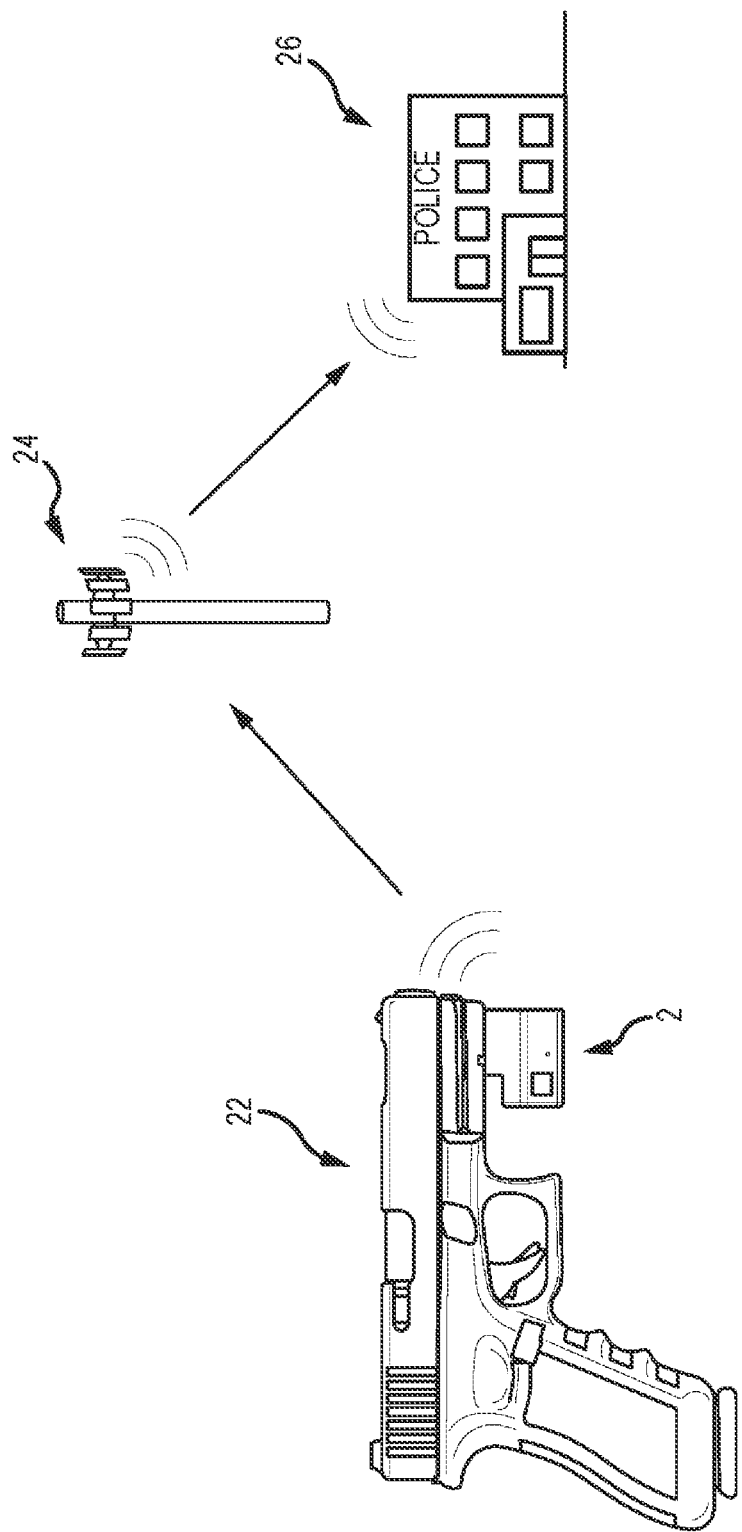
FIG. 8 depicts a system having a firearm equipped with an emergency assistance device in electronic communication with a remote user.

Now referring to FIG. 8, a system for transmitting an emergency signal from a firearm 22 to a remote user 26 is provided. The firearm 22 in this system is a pistol with a picatinny rail located on the frame of the pistol, underneath the barrel of the pistol. An emergency assistance device 2 is selectively interconnected to the picatinny rail of the firearm 22. The location of the selective interconnection between the firearm 22 and the emergency assistance device 2 allows the emergency assistance device 2 to remain out of the user's line of sight, which may be defined as three dimensional conical volume extending from the user's eye down the sight of the firearm at an approximately 2 degree visual angle.

The emergency assistance device 2 may comprise a transceiver that emits an emergency signal. As described in embodiments elsewhere herein, a user may press, for example, a button on the emergency assistance device 2 to cause the transceiver to emit an emergency signal. This emergency signal may then be received by a base transceiver station 24 that is commonly utilized in wireless cellular phone networks. Emergency signals are prioritized by the base transceiver station regardless of whether the user has a subscription to use the base transceiver station 24 of a particular telecommunications company.

Once the base transceiver station 24 receives the emergency signal from the emergency assistance device 2, the base transceiver station 24 may relay the emergency signal to the transceiver of a remote user 26, which in this embodiment is a police station or a public-safety answering point. The transceivers of the emergency assistance device 2 and the remote user 26 may establish a two-way wireless communication connection via the base transceiver station 24, much like a conventional cellular telephone call. This allows the user of the firearm 22 to communicate directly, for example, with a 9-1-1 operator without the user taking his or her hands off of the firearm 22.

In some embodiments, the emergency signal from the emergency assistance device 2 is simply a distress beacon that may contain information regarding the user's position. Embodiments of the emergency assistance device 2 may be equipped with GPS receivers. Thus, the emergency assistance device 2 may transmit the user's current location to a remote user 26 such that emergency help may be sent to the latest GPS coordinates of the emergency assistance device 2.

Figure 9:
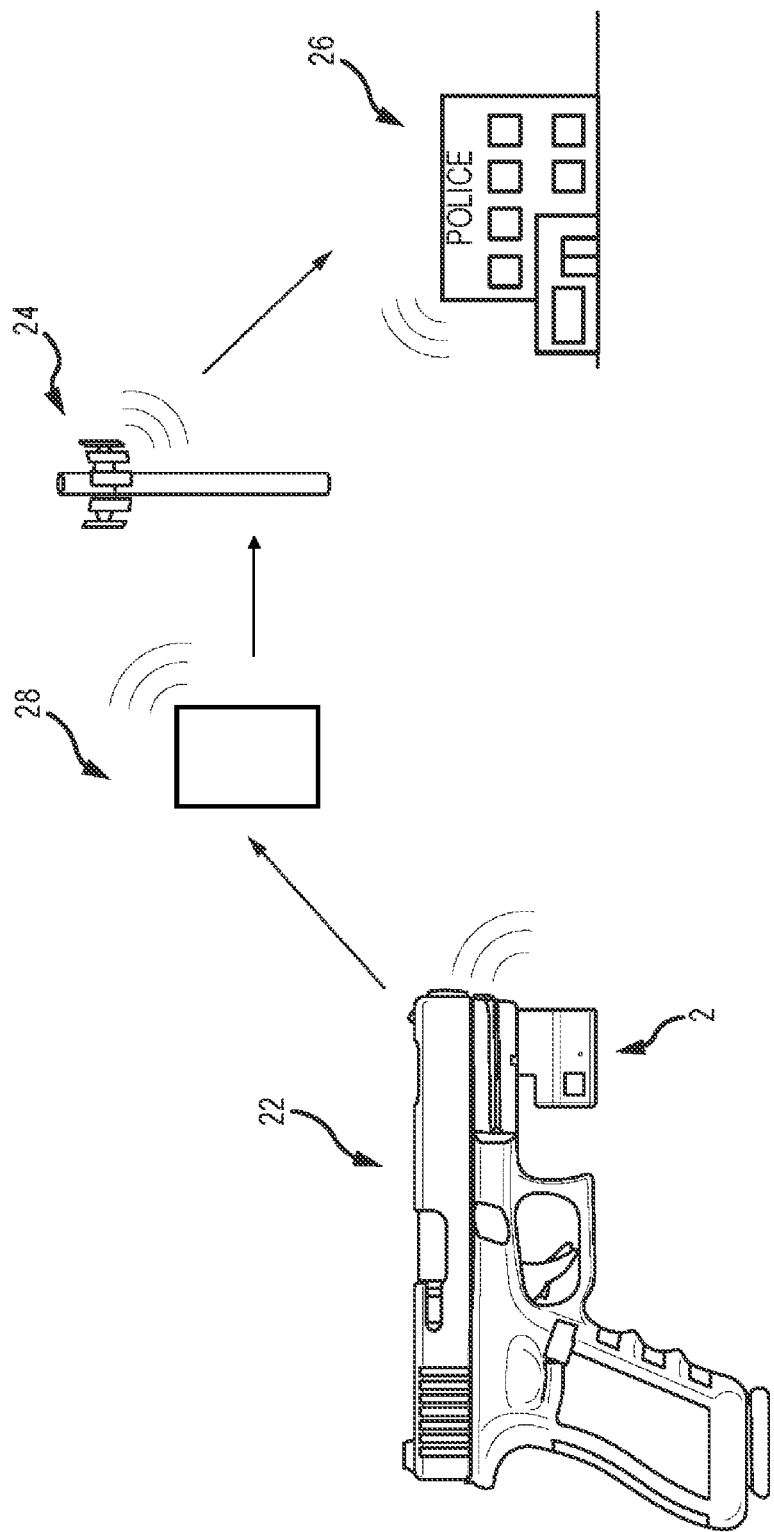
FIG. 9 depicts a system having a firearm equipped with an emergency assistance device using a mobile electronic device to communicate with a remote user.

FIG. 9 depicts a system for transmitting an emergency signal from a firearm 22 to a remote user 26 using a mobile electronic device 28. In some embodiments of the present invention, it may be advantageous to incorporate a mobile electronic device 28 such as a cell phone into the system. Thus, the emergency assistance device 2 establishes an electronic communication with the mobile electronic device 28, which is likely to be nearby, instead of directly with a base transceiver station 24, which may be miles away. Accordingly, the emergency assistance device 2 may be outfitted with a lower power transceiver and/or a smaller power source, for example, a smaller battery.

As noted above, the emergency assistance device 2 may establish an electronic communication with a nearby mobile electronic device 28. Many protocols that currently exist— or that may be implemented in the future—can be used to establish the electronic communication. For example, the currently popular Bluetooth standard may be utilized to establish a short-range electronic communication between the emergency assistance device 2 and the mobile electronic device 28. Other protocols that may be utilized include Bluetooth Low Energy, Near Field Communications (ISO/IEC 14443 and ISO/IEC 18000-3), etc.

In one scenario, a user has a firearm 22 equipped with an emergency assistance device 2, and the user desires to contact an emergency service such as 9-1-1. To begin the effort, the user presses an activation feature on the emergency assistance device 2. A transceiver within the emergency assistance device 2 emits an electromagnetic signal according to a first protocol to establish an electronic communication with a mobile electronic device 28. Once the mobile electronic device 28 receives the signal from the emergency assistance device 2, the mobile electronic device 28 establishes an electronic communication with a base transceiver station 24 according to a second protocol such as cellular communication standards, which in turn relays the electronic communication to a remote user 26 such as a 9-1-1 operator. The emergency assistance device 22 may be paired with a downloadable application on the mobile electronic device 28. The application may interpret the received electronic signal from the emergency assistance device 2 and instruct the mobile electronic device 28 to place an emergency call to the remote user 26.

It will be appreciated that systems and embodiments of the present invention described herein may incorporate a mobile electronic device 28. For example, when an electronic communication is described between the emergency assistance device 2 and the base transceiver station 24, the mobile electronic device 28 may be incorporated as an intermediary device that already has the capability of sending an emergency signal to a base transceiver station 24 and a remote user 26.

Figure 10A:
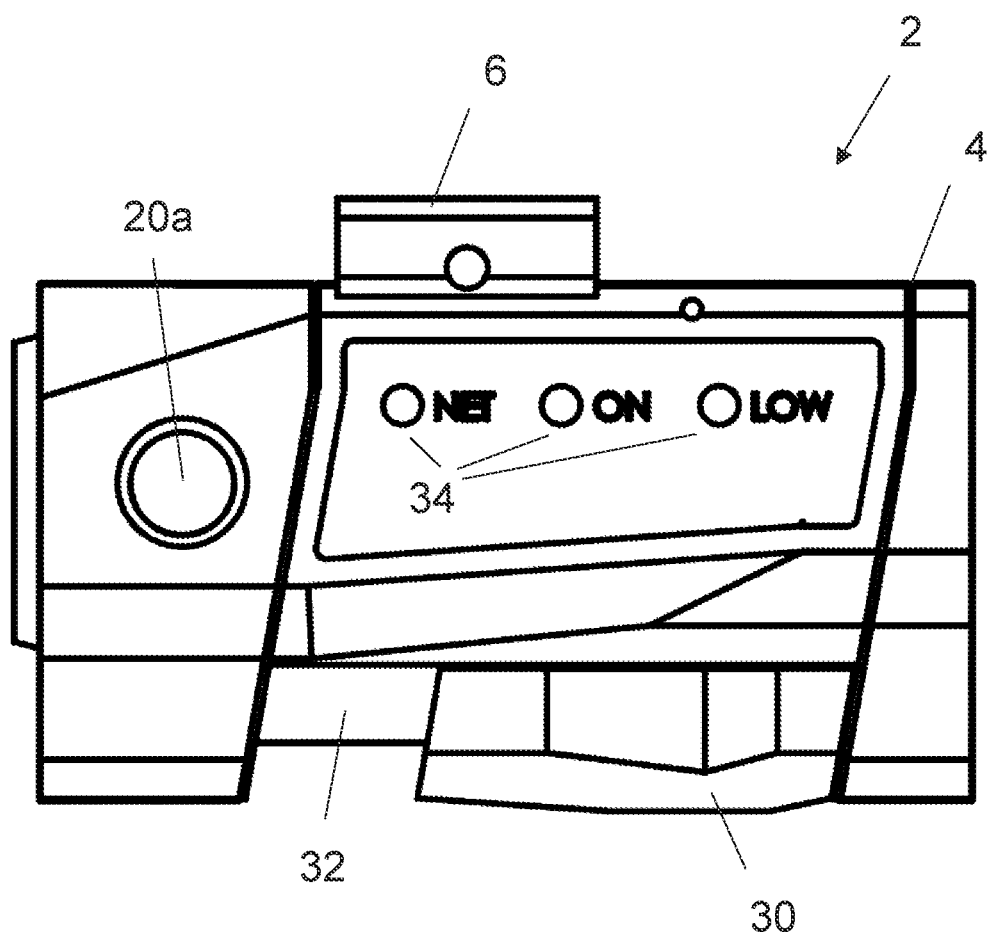
FIG. 10A depicts a right elevation view of a further embodiment of an emergency device according to some embodiments of the present invention.

FIGS. 10A-10E depict various views of a further embodiment of an emergency assistance device 2. FIG. 10A shows a side elevation view of the emergency device 2, which comprises a housing 4, a mounting feature 6, and a button 20a as described elsewhere herein. The emergency device 2 also has an activation feature 30 that moves along a lower portion 32 of the emergency device 2. Activation features such as switches and buttons are described elsewhere herein, and as shown in FIG. 10A, the activation feature 30 is a slider button that moves between a rear position and a fore position along the lower portion 32. The activation feature 30 in FIG. 10A is shown in the rear position such that any functionality associated with the activation feature 30 has not yet been "activated". When the activation feature 30 is moved to a fore position along the lower portion 32, the emergency device 2 "activates" or causes the emergency device 2 to perform one or more functions as described elsewhere herein. For instance, when the activation feature 30 moves from a rear position to a fore position along the lower portion 32, the emergency device 2 can establish electronic communication with a base transceiver station and a remote user.

It will be appreciated that the activation feature 2 can move from a fore position to a rear position, a left position to a right position, rotate between positions, etc. to cause the electronic device 2 to perform one or more functions. Additional functions can include turning on a light, a microphone, a speaker, etc. The emergency device 2 can also have various indicators 34, which in this embodiment are lights, that display the status of various functions of the emergency device 2. The light labeled "net" can turn on to indicate when a transceiver of the emergency device 2 has successfully established a connection with a remote station and user. This lets the user of the emergency device 2 know that the user can communicate into a microphone to the remote user, receive instructions from the remote user via a speaker, etc. The light labeled "on" can turn on to indicate that the emergency device is powered and ready to receive inputs and/or provide outputs such as performing a function. In addition, the light labeled "low" can turn on to indicate that a power supply or battery of the emergency device 2 is low on power and should be soon replaced or recharged.

Figure 10B:
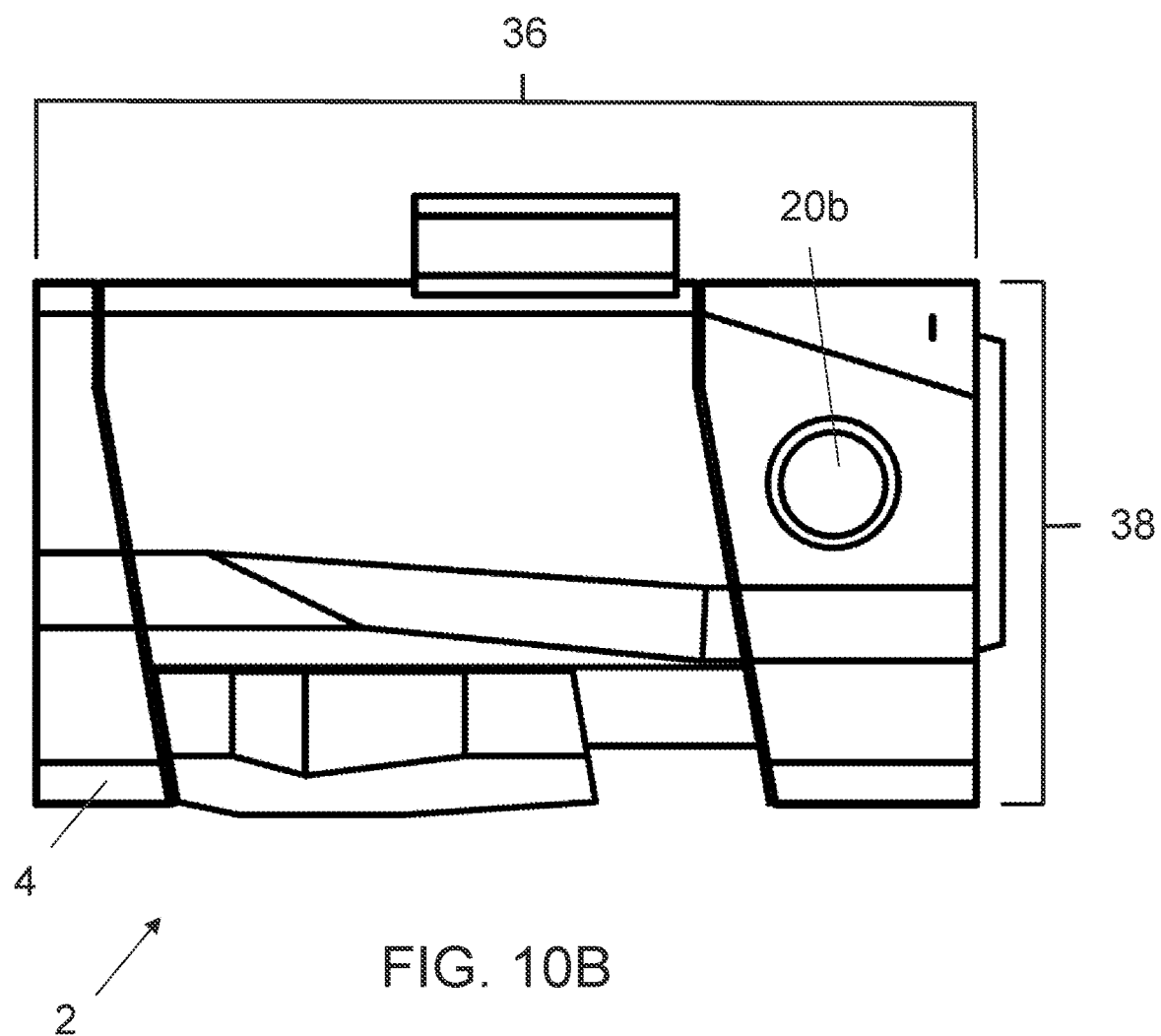
FIG. 10B depicts a left elevation view of the emergency device of FIG. 10A.
Figure 10C:
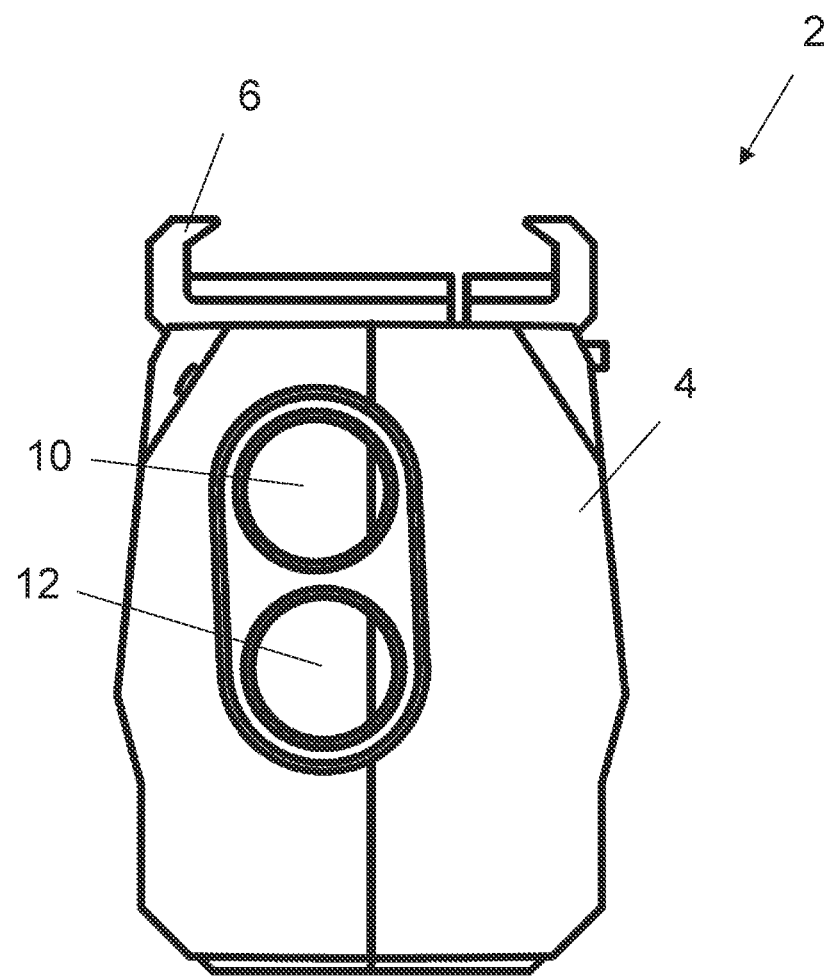
FIG. 10C depicts a front elevation view of the emergency device of FIG. 10A.
Figure 10D:
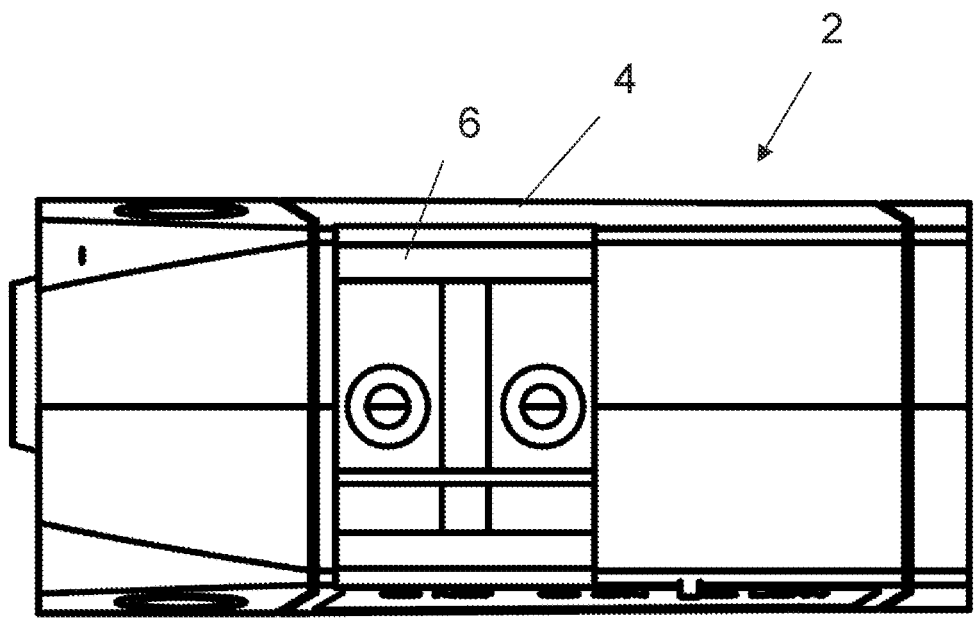
FIG. 10D depicts a top plan view of the emergency device of FIG. 10A.
Figure 10E:
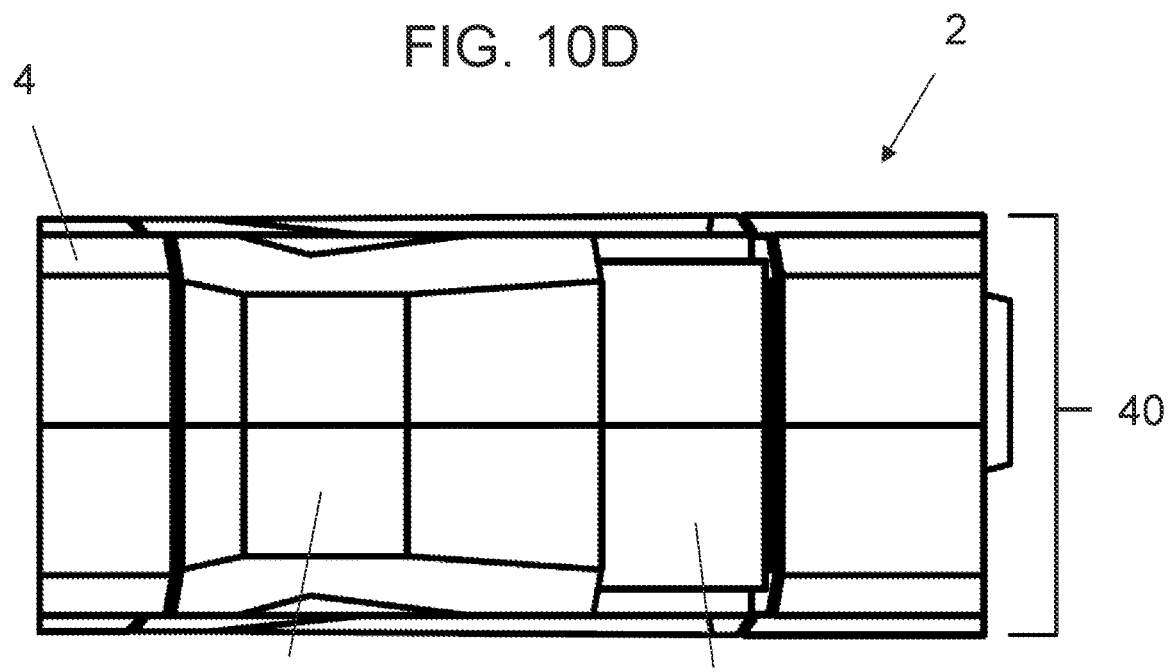
FIG. 10E depicts a bottom plan view of the emergency device of FIG. 10A.

FIGS. 10B-10E show further views of the emergency device 2 of FIG. 10A. FIG. OB shows a length dimension 36 and a height dimension 38 of the emergency device 2. In some embodiments, the length dimension 36 is between approximately 65 and 80 mm. In various embodiments, the length dimension 36 is approximately 72 mm. In some embodiments, the height dimension 38 is between approximately 30 and 50 mm. In various embodiments, the height dimension 38 is approximately 40 mm. Also shown in FIG. 10B is another button 20b, which can be activated to cause the emergency device 2 to perform one or more functions as described herein. For instance, pressing the button 20b can turn on a light. FIG. 10C shows a front elevation view where a light 10 and a camera 12 are depicted. FIG. 10D shows a top plan view of the emergency device 2 where the mounting device 6 is depicted. FIG. 10E shows a bottom plan view of the emergency device 2 and a width dimension 40 of the emergency device 2. In some embodiments, the width dimension 40 is between approximately 25 to 40 mm. In various embodiments, the width dimension 40 is approximately 32 mm.

Figure 11A:
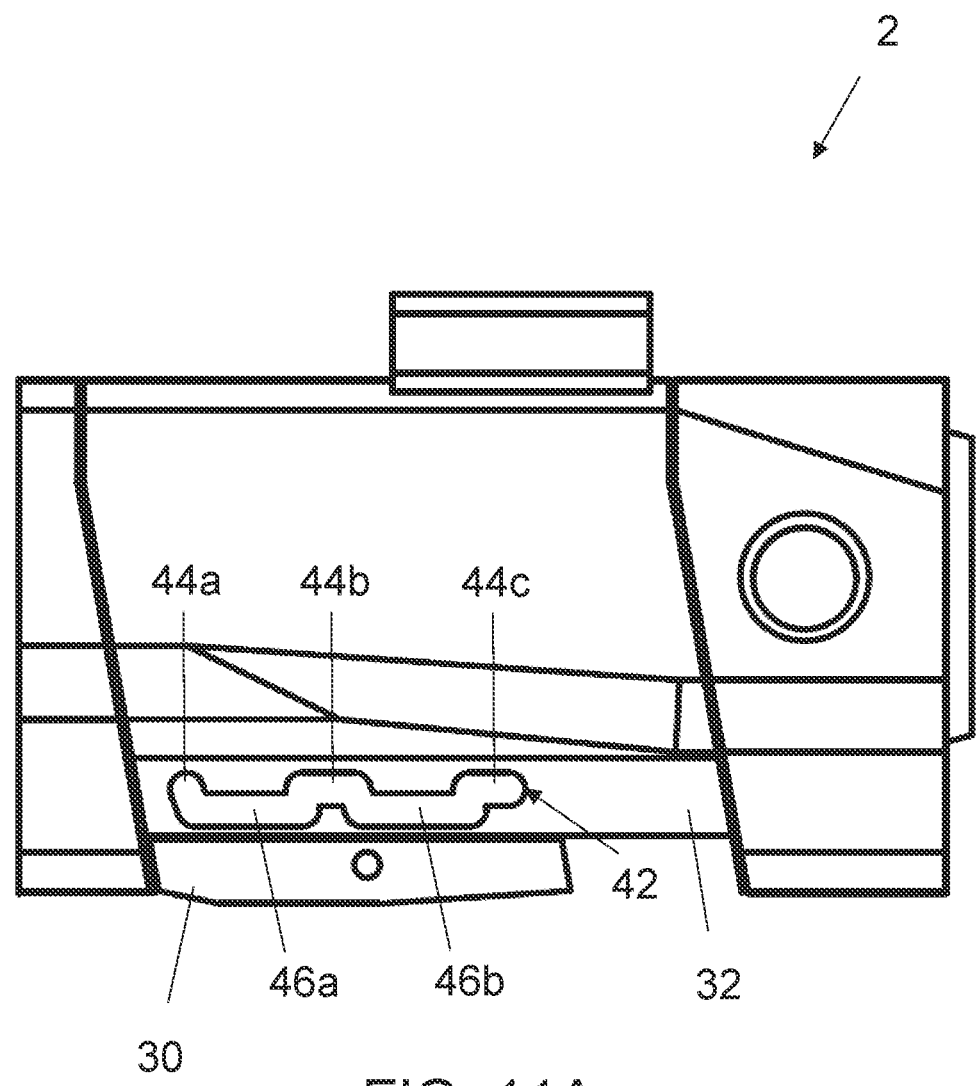
FIG. 11A depicts a partial cross-sectional, left elevation view of an emergency device.
Figure 11B:
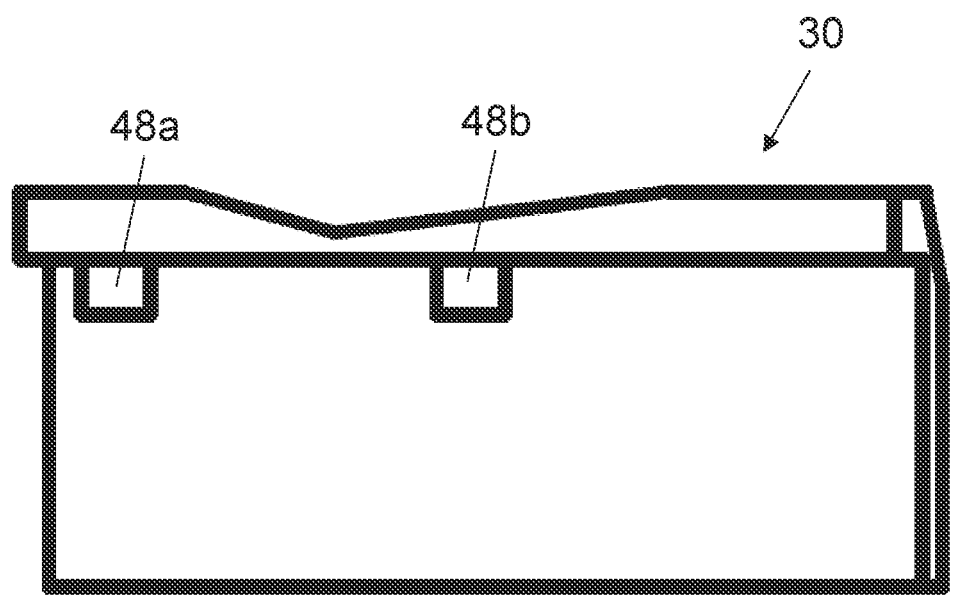
FIG. 11B depicts a top plan view of an activation feature according to some embodiments of the present invention.
Figure 11C:
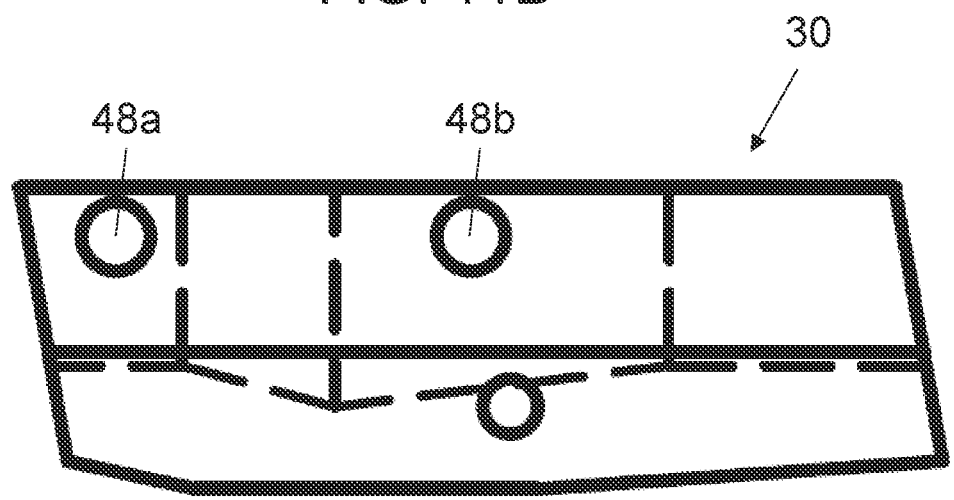
FIG. 11C depicts a side elevation view of the activation feature of FIG. 11B.

FIGS. 11A-11C depicted various views of an exemplary arrangement between the activation feature 30 and the lower portion 32 of the emergency device 2. The emergency device 2 can be attached to a weapon, and the unintentional movement of the activation feature to cause the performance of one or more functions can have negative consequences. During an emergency such as a home invasion, the unintentional flashing of a light or broadcast of an audible signal can compromise the safety of the user. Moreover, the unintentional request for assistance from a base station and remote user such as an emergency service can draw from the limited resources of that emergency service. Thus, the activation feature 30 in some embodiments does not move directly from the rear position to the fore position in a single direction. The activation feature 30 shown in FIGS. 11A-11C is retained in a rear position such that the activation feature 30 must first move downward before moving from a rear position to a fore position. A biasing member such as a spring can press the activation feature 30 upward such that the activation feature 30 is retained in the rear and fore positions. Thus, the down-forward-up sliding motion and retention at rear and fore positions reduces the likelihood of an unintentional movement of the activation feature 30.

FIG. 11A, is a partial cross-sectional view of the emergency device 2 in FIG. 10A where part of the activation feature 30 has been cut away to reveal a channel 42 extending into a side of the lower portion 32 of the emergency device 2. In this embodiment, the channel 42 has a first upper portion 44a, a second upper portion 44b, and a third upper portion 44c. The channel 42 also has a first lower portion 46a that joins the first and second upper portions 44a, 44b and has a second lower portion 46b that joins the second and third upper portions 44b, 44c. These various portions 44a, 44b, 44c, 46a, 46b form a continuous channel 42 with a constant width and depth along a length of the channel 42. However, it will be appreciated that embodiments of the emergency device 2 can include a channel 42 with varying width and/or depth.

FIGS. 11B and 11C show a rear pin 48a and a fore pin 48b that extend from the inner surface of the activation feature 30 into the channel 42. The pins 48a, 48b can move along the channel 42 such that the activation feature 30 moves along the lower portion 32. When the activation feature 30 is in a rear position relative along the lower portion 32, the rear pin 48a is positioned in the first upper portion 44a of the channel 42, and the fore pin 48b is positioned in the second upper portion 44b of the channel 42. As mentioned above, a bias member such as a spring can hold and retain the activation feature 30 in this position. Thus, the activate feature 30 is less likely to be unintentionally dislodged from the rear position.

To move the activation feature 30 to the fore position along the lower portion 32 and cause the emergency device 2 to perform one or more functions, the activation feature 30 is first moved downward to overcome the bias member. This moves the rear pin 48a into the first lower portion 46a of the channel 42 and the fore pin 48b into the second lower portion 46b. Now the pins 48a, 48b, and thus the activation feature 30, can move forward in the lower portions 46a, 46b of the channel 42. Once the activation feature 30 is at the fore position, the user can release the activation feature 30 such that the bias member presses upward, and the rear pin 48a enters the second upper portion 44b of the channel 42, and the fore pin 48b enters the third upper portion 44c of the channel 42. Again, the activation feature 30 is retained in the fore position such that unintentional movement of the activation feature 30 is less likely.

The two pin 48a, 48b configuration makes the engagement between the activation feature 30 and the lower portion 32 more stable and prevents a forward and rearward tilt of the activation feature 30 relative to the lower portion 32. However, it will be appreciated that any number of pins and portions of the channel are contemplated. For example, the activation feature 30 may have two pins 48a, 48b, but the channel 42 can have four upper portions and three lower portions such that the activation feature 30 can selectively move between three positions instead of two. The upper and lower portions of the channel 42 can also be flipped in some embodiments such that the activation feature 30 is retained in a downward position. It will be appreciated that while the channel 42 is depicted as extending into one side of the lower portion 32, the emergency device 2 can have a pin and channel combination on both the left and right sides of the lower portion 32.

In this specification, the phrases "at least one", "one or more", and "and/or", as used herein, are open-ended expressions that are both conjunctive and disjunctive in operation. For example, each of the expressions "at least one of A, B, and C", "at least one of A, B, or C", "one or more of A, B, and C", "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification, drawings, and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having," and variations thereof, is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts, and the equivalents thereof, shall include all those described in the summary of the invention, brief description of the drawings, detailed description, abstract, and claims themselves.

The foregoing description of the present invention has been presented for illustration and description purposes. However, the description is not intended to limit the invention to only the forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Consequently, variations and modifications commensurate with the above teachings and skill and knowledge of the relevant art are within the scope of the present invention. The embodiments described herein above are further intended to explain best modes of practicing the invention and to enable others skilled in the art to utilize the invention in such a manner, or include other embodiments with various modifications as required by the particular application(s) or use(s) of the present invention. Thus, it is intended that the claims be construed to include alternative embodiments to the extent permitted by the prior art.

What is claimed is:

1. An emergency assistance device for a firearm, comprising:
    a housing having a mounting feature disposed on the housing, the mounting feature adapted to selectively interconnect to a firearm, wherein a channel extends into the housing, the channel has two upper portions extending in one direction and a lower portion extending in another direction, and the lower portion joins the upper portions together;
    a first camera disposed on the housing;
    a first light source disposed on the housing;
    a transceiver disposed in the housing, the transceiver configured to emit an emergency signal;
    an activation feature configured to move between a first position and a second position and configured to be retained in the first position and retained in the second position;
    a pin extending from the activation feature and into the channel, wherein the pin is positioned in one upper portion when the activation feature is retained in the first position, wherein the pin moves along the lower portion as the activation feature moves from the first position to the second position, and wherein the pin is positioned in the other upper portion when the activation feature is retained in the second position; and
    wherein movement of the activation feature out of retainment in the first position, from the first position to the second position, and into retainment in the second position causes at least one of:
    the first camera to record a video;
    the first light source to emit a light; or
    the transceiver to emit the emergency signal.

2. The emergency assistance device of claim 1, wherein the mounting feature is disposed on a first surface of the housing, and the first camera and the first light source are disposed on a second surface of the housing;
    wherein a microphone is disposed on the second surface of the housing, and the microphone is configured to record a sound that corresponds to the recorded video of the first camera;
    wherein a speaker is disposed on a third surface of the housing, and the transceiver sends an audio signal to the speaker and the speaker generates a corresponding sound.

3. The emergency assistance device of claim 2, further comprising a second microphone disposed on the third surface of the housing, wherein the microphone is configured to record the sound that corresponds to the recorded video of the first camera.

4. The emergency assistance device of claim 3, further comprising a sound device that compares an aspect of the sound as recorded by the first microphone to the aspect of the sound as recorded by the second microphone.

5. The emergency assistance device of claim 1, further comprising a wireless network having a base transceiver station configured to receive the emitted emergency signal from the emergency assistance device, wherein the base transceiver relays the emergency signal to a remote user.

6. The emergency assistance device of claim 1, further comprising a bias member positioned between the activation feature and the housing to retain the activation member in the first position and the second position.

7. The emergency assistance device of claim 1, wherein the emergency assistance device further comprises a button on the emergency assistance device to cause the transceiver to emit the emergency signal.

8. The emergency assistance device of claim 1, wherein the activation feature is a slide button.

9. An emergency assistance device for a firearm, comprising:
    a housing having a mounting feature adapted to selectively interconnect to a firearm, wherein a channel extends into the housing, the channel has two upper portions extending in one direction and a lower portion extending in another direction, and the lower portion joins the upper portions together;
    a first camera disposed on the housing;
    a first light source disposed on the housing;
    a second light source disposed on the housing;
    an activation feature configured to move between a first position and a second position and configured to be retained in the first position and retained in the second position;
    a pin extending from the activation feature and into the channel, wherein the pin is positioned in one upper portion when the activation feature is retained in the first position, wherein the pin moves along the lower portion as the activation feature moves from the first position to the second position, and wherein the pin is positioned in the other upper portion when the activation feature is retained in the second position; and
    wherein movement of the activation feature out of retainment in the first position, from the first position to the second position, and into retainment in the second position causes at least one of:
        the first camera to record a video;
        the first light source to emit a light; and
        the second light source to emit a light.

10. The emergency assistance device of claim 9, wherein the mounting feature is disposed on a first surface of the housing, the first camera and the first light source are disposed on a second surface of the housing, and the second light source is disposed on a third surface of the housing;
    wherein a transceiver is disposed in the housing, the transceiver configured to emit an emergency signal; and
    wherein a second camera is disposed on the third surface of the housing, wherein the first camera has a first recordation field and the second camera has a second recordation field, wherein at least a portion of the first recordation field overlaps at least a portion of the second recordation field.

11. The emergency assistance device of claim 10, further comprising a microphone disposed on the second surface of the housing, wherein the microphone is configured to send a corresponding audio signal to the transceiver.

12. The emergency assistance device of claim 10, wherein the emergency assistance device further comprises a button on the emergency assistance device to cause the transceiver to emit the emergency signal.

13. The emergency assistance device of claim 12, wherein the channel comprises a third upper portion and a second lower portion, and a second pin extends from the activation feature into the channel, wherein the second pin is positioned in the other upper portion when the activation feature is retained in the first position, wherein the second pin moves along the second lower portion as the activation feature moves from the first position to the second position, and wherein the second pin is retained in the third upper portion when the activation feature is retained in the second position.

14. The emergency assistance device of claim 9, wherein a receiver disposed in the housing gathers position data of the emergency assistance device from at least one of a Global Positioning System, a Galileo system, a LORAN system, a Glonass system, an Indian Regional Navigation Satellite System, a Chinese Compass navigation system, and a cell phone tower.

15. The emergency assistance device of claim 9, wherein the housing comprises a recess that corresponds to a trigger guard of the firearm.

16. An emergency assistance device, comprising:
    a mounting feature configured to selectively interconnect to a firearm;
    a transceiver configured to emit an emergency signal;
    an activation feature configured to move between a first position and a second position and configured to be retained in the first position and retained in the second position, wherein movement of the activation feature out of retainment in the first position, from the first position to the second position, and into retainment in the second position causes the first transceiver to emit the emergency signal;
    a channel extending into a side of the housing, wherein the channel has two upper portions extending in one direction and a lower portion extending in another direction, wherein the lower portion joins the upper portions together;
    a pin extending from the activation feature and into the channel, wherein the pin is positioned in one upper portion when the activation feature is retained in the first position, wherein the pin moves along the lower portion as the activation feature moves from the first position to the second position, and wherein the pin is positioned in the other upper portion when the activation feature is retained in the second position.

17. The emergency assistance device of claim 16, further comprising:
    a light source disposed on a front surface of the emergency assistance device.

18. The emergency assistance device of claim 17, wherein in a first mode of operation engagement of the activation feature causes the light source to emit light, wherein in a second mode of operation engagement of the activation feature causes the transceiver to emit the emergency signal.

19. The emergency assistance device of claim 16, further comprising:
    a camera disposed on a front surface of the emergency assistance device.

20. The emergency assistance device of claim 19, wherein in a first mode of operation engagement of the activation feature causes the camera to record video, wherein in a second mode of operation engagement of the activation feature causes the transceiver to emit the emergency signal.

* * * * *